US009904516B2

United States Patent
Bos et al.

(10) Patent No.: US 9,904,516 B2
(45) Date of Patent: Feb. 27, 2018

(54) MODULAR EXPONENTIATION USING LOOK-UP TABLES

(71) Applicant: NXP B.V., Eindhoven (NL)

(72) Inventors: Joppe Bos, Interleuvenlaan (BE); Michaël Peeters, Interleuvenlaan (BE)

(73) Assignee: NXP B.V., Eindhoven (NL)

( * ) Notice: Subject to any disclaimer, the term of this patent is extended or adjusted under 35 U.S.C. 154(b) by 209 days.

(21) Appl. No.: 14/689,219

(22) Filed: Apr. 17, 2015

(65) Prior Publication Data

US 2016/0179473 A1 Jun. 23, 2016

Related U.S. Application Data

(63) Continuation-in-part of application No. 14/580,963, filed on Dec. 23, 2014.

(51) Int. Cl.
*G06F 7/72* (2006.01)
*H04L 9/32* (2006.01)
*G06F 9/30* (2018.01)

(52) U.S. Cl.
CPC ............ *G06F 7/72* (2013.01); *G06F 7/723* (2013.01); *G06F 9/3001* (2013.01); *G06F 9/30007* (2013.01); *G06F 9/30018* (2013.01); *H04L 9/3249* (2013.01)

(58) Field of Classification Search
CPC ........ G06F 7/72; G06F 9/30018; G06F 7/723; G06F 9/30007; G06F 9/3001; H04L 9/3249
USPC .......................................................... 380/30
See application file for complete search history.

(56) References Cited

U.S. PATENT DOCUMENTS

| | | | |
|---|---|---|---|
| 4,885,777 | A | 12/1989 | Takaragi et al. |
| 5,297,206 | A | 3/1994 | Orton |
| 5,519,778 | A | 5/1996 | Leighton et al. |
| 6,064,740 | A | 5/2000 | Curiger |
| 6,091,819 | A | 7/2000 | Venkatesan et al. |
| 6,298,442 | B1 | 10/2001 | Kocher |
| 6,480,605 | B1 | 11/2002 | Uchiyama et al. |
| 7,653,196 | B2 | 1/2010 | Koshy |
| 7,792,894 | B1 | 9/2010 | Cohn et al. |
| 9,652,200 | B2 | 5/2017 | Bos et al. |
| 2002/0126838 | A1 | 9/2002 | Shimbo |
| 2003/0072454 | A1 | 4/2003 | Krawetz |
| 2004/0054906 | A1 | 3/2004 | Carro |

(Continued)

OTHER PUBLICATIONS

Bellare, M., et al., "The Exact Security of Digital Signatures—How to Sign with RSA and Rabin", May 12, 1996 (May 12, 1996), Advances in Cryptology—Eurocrypt '96, International Conference of the Theory and Application of Cryptographic Techniques, Saragossa, May 12-16, 1996, XP019194382, ISBN: 978-3-540-61186-8, section 1.1.

(Continued)

*Primary Examiner* — Baotran N To

(57) ABSTRACT

Various embodiments relate to a method of encoding data and a related device and non-transitory machine readable storage medium, including: determining a plurality of factors of a value, b, to be exponentiated; retrieving, from a lookup table, a plurality of lookup table entries associated with the plurality of factors; calculating a product of the plurality of lookup table entries; and calculating a residue of the product using a cryptographic key modulus, N, to produce an exponentiated value, s.

14 Claims, 11 Drawing Sheets

(56) References Cited

U.S. PATENT DOCUMENTS

| | | | |
|---|---|---|---|
| 2006/0059219 A1* | 3/2006 | Koshy | G06F 7/728 708/491 |
| 2006/0064761 A1 | 3/2006 | Multerer et al. | |
| 2008/0025502 A1* | 1/2008 | Kounavis | G06F 7/722 380/30 |
| 2008/0226064 A1 | 9/2008 | Douguet et al. | |
| 2013/0054665 A1 | 2/2013 | Felch et al. | |
| 2014/0019759 A1 | 1/2014 | Burmester | |
| 2016/0019339 A1 | 1/2016 | Sazonov et al. | |
| 2016/0085955 A1 | 3/2016 | Lerner | |
| 2016/0182230 A1 | 6/2016 | Peeters et al. | |
| 2016/0182235 A1 | 6/2016 | Bos et al. | |
| 2016/0182236 A1 | 6/2016 | Peeters et al. | |

OTHER PUBLICATIONS

Menezes, A., Handbook of Applied Cryptography, Chapter 11—Digital Signatures, In Handbook of Applied Cryptography, Jan. 1, 1997 (Jan. 1, 1997), CRC Press, XP055037114, pp. 425-488, section 11.1.1.

Extended European Search Report dated Aug. 30, 2016 in EP Application 16162985.2.

A White-box DES Implementation for DRM applications, Digital Rights management workshop—DRM 2002, Lecture Notes in Computer Science vol. 2696 Springer, 2003.

Arndt, "Algorithms for Programmers—ideas algorithms and source code", 2004.

Bernstein, "Enumerating and counting smooth integers", 1991.

Chow, "White-box cryptography and an AES implementation, Selected Areas in Cryptography—SAC 2002", (Kaisa Nyberg and Howard M. Heys, eds. Lecture Notes in Computer Science, vol. 2696, 2003, 1-15.

Elgamal, "A public key cryptosystem and a signature scheme based on a discrete logarithms", IEEE Transactions on Information Theory 31, 1985, 469-472.

Harvey Garner, "The residue number system, IRE Transactions on Electronic Computers", 1959, 140-147.

Jacob, et al., "Attacking an obfuscated cipher by injecting faults, Digital Rights Management Workshop—DRM 2002", Lecture Notes in Computer Science vol. 2696, Springer, 2003, 16-31.

Jean-Claude Bajard, et al., "An RNS montgomery modular multiplication algorithm", IEEE Trans. Computers 47, No. 7, 1998, 766-776.

Karl C. Posch, et al., "Modulo reduction in residue number systems, IEEE Trans. Parallel Distrib. Syst.", 1995, 449-454.

Mohamed Karroumi, "Protecting white-box AES with dual ciphers, Information Security and Cryptology ICISC 2010", Lecture Notes in Computer Science, vol. 6829, Springer 2010, 2010, 278-291.

Olivier Billet, et al., "Cryptanalysis of a white box AES implementation", Selected Areas in Cryptography (SAC); Lecture notes in computer science, 2004, 227-240.

Peter L. Montgomery, "Modular multiplication without trial division,Mathematics of Computation", No. 170, 1985, 519-521.

R.L. Rivest, et al., "A method for obtaining digital signatures and public-key cryptosytems", Communications of the ACM 21, 1978, 120-126.

Roy D. Merrill, "Improving digital computer performance using residue number theory, Electronic Computers", IEEE Transactions on EC-13, No. 2, 1964, 93-101.

Royle, "Combinatorial enumeration : Theory and Practice", 2004.

Stolee, "Ranking and unranking of combinations and permutations", http:// computational combinatorics.wordpress.com/2012/09/10 ranking -and-unranking-of-combinations-and-permutations/, Sep. 2012.

Yaying Xiao, et al., "A secure implementation of white-box AES, Computer Science and its Applications", CSA, 2009, 1-6.

Extended European Search Report dated Jun. 28, 2015 in EP Appl. No. 15202799.1.

Roy (Roy et al., Progress in Cryptology INDOCRYPT 2009, 10th International Conference on Cryptology in India, Dec. 2009, Springer LNCS 5922.

Schneier (Bruce Schneier, Applied Cryptography, Protocols, Algorithms and Source Code in C, 2nd Edition, 1996 ISBN: 0471117099.

Stallings(William Stallings, Cryptography and Network Security, 2nd Edition, 1998, ISBN: 0138690170.

Final Office Action dated Nov. 16, 2016 for U.S. Appl. No. 14/689,139, 6 pages.

Non-Final Office Action dated May 20, 2016 for U.S. Appl. No. 14/689,139, 9 pages.

Extended European Search report dated Mar. 16, 2016 for EP Application No. 15201631.7, 6 pages.

Final Office Action dated Dec. 20, 2016 for U.S. Appl. No. 14/580,963, 5 pages.

Non-Final Office Action dated May 6, 2016 for U.S. Appl. No. 14/580,963, 12 pages.

Non-Final Office Action dated Oct. 6, 2016 for U.S. Appl. No. 14/580,963, 9 pages.

Notice of Allowance dated Aug. 1, 2017 for U.S. Appl. No. 14/580,963, 5 pages.

Non-Final Office Action dated Dec. 1, 2016 for U.S. Appl. No. 14/624,874, 4 pages.

Non-Final Office Action dated Sep. 26, 2016 for U.S. Appl. No. 14/624,874, 6 pages.

Notice of Allowance dated Mar. 10, 2017 for U.S. Appl. No. 14/624,874, 5 pages.

Notice of Allowance dated Oct. 7, 2016 for U.S. Appl. No. 14/705,316, 24 pages.

Arends, R. et al., "Resource Records for the DNS Security Extensions," Telematica Instituut; XP015041965, ISSN: 0000-0003; JCT-VC Meeting; Mar. 16-23, 2005; 29 pages.

Bajard, Jean-Claude et al., "Fault Detection in RNS Montgomery Modular Multiplication," 21st IEEE Symposium on Computer Arithmetic, Apr. 7, 2013, pp. 119-126.

Devine, "Design and Implementation of DDH: A Distributed Dynami Hashing Alogrithm", Proceeding FODO, pp. 101-114.

Hartke, Stephen, "Ranking and Unranking of k-Subsets, or How I Learned to Stop Worrying and Love Colex," Presentation, Department of Mathematics, University of Nebraska—Lincoln; www.math.unl.edu/shartke2; 62 pages.

Josefsson, S, "The Base16, Base32, and Base 64 Data Encodings," JCT-VC Meeting Mar. 16-23, 2001; Joint Collaborative Team on Video Coding of ISO-IEC JTC1-SC29-WG11 and ITU-T SG.16; XP015055032; ISSN 0000-0003; Oct. 2006; 18 pages.

Menezes et al., "Handbook of Applied Cryptography", ISBN, Chapters 9 and 11, 1997, ISBN: 0849385237; 131 pages.

Sung, Sam Y., "Performance Analysis of Superimposing-Coded Signature Files", Foundations of Data Organization and Algorithms,vol. 730 of the series Lecture Notes in Computer Science, pp. 115-129.

Notice of Allowance dated Dec. 13, 2017 for U.S. Appl. No. 14/580,936, 5 pages.

\* cited by examiner

MODULAR EXPONENTIATION USING LOOK-UP TABLES

TECHNICAL FIELD

This application is a continuation-in-part of U.S. patent application Ser. No. 14/580,963, filed on Dec. 23, 2014, the entire disclosure of which is hereby incorporated herein by reference for all purposes.

TECHNICAL FIELD

Various embodiments disclosed herein relate generally to data encoding and digital signature and, more particularly but not exclusively, to encoding for RSA-based digital signature schemes.

BACKGROUND

Digital signature schemes commonly apply encoding processes to data prior to signing a message to ensure that the data conforms to a pre-chosen alphabet to which the scheme applies. For example, a standard RSA algorithm using a key 3-tuple of <N, e, d> first converts each symbol to a corresponding value between 0 and N. Other encoding schemes may be used for different sets of input values to enable signature schemes that exploit various mathematical properties of the values in the input value set.

After encoding, the encoded values are used to create a signature for transmission. Some encryption algorithms, such as RSA, utilize a modular exponentiation function to create such a signature. As an example RSA processes an encoded value, b, using the private key pair <N, d> by computing $b^d$ mod N. RSA would then verify the signature value, s, using the public key pair <N, e> by first computing $s^e$ mod N. A decoding function is then applied to the resulting value to retrieve the original value.

SUMMARY

A brief summary of various embodiments is presented below. Some simplifications and omissions may be made in the following summary, which is intended to highlight and introduce some aspects of the various embodiments, but not to limit the scope of the invention. Detailed descriptions of a preferred embodiment adequate to allow those of ordinary skill in the art to make and use the inventive concepts will follow in later sections.

Various embodiments described herein relate to a non-transitory machine-readable medium encoded with instructions for performing modular exponentiation, the non-transitory machine-readable medium including: instructions for determining a plurality of factors of a value, b, to be exponentiated; instructions for retrieving, from a lookup table, a plurality of lookup table entries associated with the plurality of factors; instructions for calculating a product of the plurality of lookup table entries; and instructions for calculating a residue of the product using a cryptographic key modulus, N, to produce an exponentiated value, s.

Various embodiments described herein relate to a device for performing modular exponentiation, the non-transitory machine-readable medium including: a memory configured to store a lookup table; and a processor in communication with the memory, the processor being configured to: determine a plurality of factors of a value, b, to be exponentiated; retrieve, from the lookup table, a plurality of lookup table entries associated with the plurality of factors; calculate a product of the plurality of lookup table entries; and calculate a residue of the product using a cryptographic key modulus, N, to produce an exponentiated value, s.

Various embodiments described herein relate to a method for performing modular exponentiation including determining a plurality of factors of a value, b, to be exponentiated; retrieving, from a lookup table, a plurality of lookup table entries associated with the plurality of factors; calculating a product of the plurality of lookup table entries; and calculating a residue of the product using a cryptographic key modulus, N, to produce an exponentiated value, s.

Various embodiments are described wherein the instructions for determining a plurality of factors of a value, b, to be exponentiated include: instructions for encoding a value, h, by identifying the plurality of factors from a factor set S to represent the value, h.

Various embodiments are described wherein: the instructions for determining a plurality of factors of a value, b, to be exponentiated include instructions for determining a plurality of indices respectively associated with the plurality of factors in a factor set S; and the instructions for retrieving a plurality of lookup table entries associated with the plurality of factors include instructions for retrieving the plurality of lookup table entries from positions in the lookup table respectively indicated by the plurality of indices.

Various embodiments additionally include instructions for computing a digest, h, of a message, m, to be digitally signed; instructions for encoding the digest, h, to produce the value, b, to be exponentiated; and instructions for transmitting the message, m, and exponentiated value, s, as a digital signature to a network device.

Various embodiments additionally include: instructions for receiving the lookup table from a network device; and instructions for storing the lookup table for subsequent access by the instructions for retrieving a plurality of lookup table entries.

Various embodiments are described wherein the plurality of factors are a plurality of prime numbers belonging to a predetermined factor set S.

Various embodiments additionally include instructions for encoding a value, h, to produce the value, b, to be exponentiated including: instructions for iterating through bit positions of the value, h; instructions for including, in the encoded value b, a factor, $s_i$, corresponding to a bit position i within a set of factors S when the bit at position i in the value, $h_i$, is set.

Various embodiments described herein relate to a non-transitory machine-readable medium encoded with instructions for execution by a processor for generating a lookup table for performing modular exponentiation, the non-transitory machine-readable medium including: instructions for determining a factor set S associated with an encoding algorithm; instructions for computing a plurality of modular exponentiations based on respective factors of the factor set S, a secret exponent, d, and a cryptographic key modulus, N; instructions for storing the plurality of modular exponentiations in a lookup table; and instructions for transmitting the lookup table to at least one user device.

Various embodiments described herein relate to a device for generating a lookup table for performing modular exponentiation, the device including: a network interface; a memory; and a processor in communication with the network interface and the memory, the processor being configured to: determine a factor set S associated with an encoding algorithm; compute a plurality of modular exponentiations based on respective factors of the factor set S, a secret exponent, d, and a cryptographic key modulus, N;

store the plurality of modular exponentiations in a lookup table; and transmit, via the network interface, the lookup table to at least one user device.

Various embodiments described herein relate to a method for generating a lookup table for performing modular exponentiation, the method including determining a factor set S associated with an encoding algorithm; computing a plurality of modular exponentiations based on respective factors of the factor set S, a secret exponent, d, and a cryptographic key modulus, N; storing the plurality of modular exponentiations in a lookup table; and transmitting the lookup table to at least one user device.

Various embodiments additionally include instructions for generating a cryptographic key including the secret exponent, d, a public exponent, e, and the cryptographic key modulus, N.

Various embodiments are described the factor set S is an ordered set, whereby individual factors, $s_i$, of the factor set, S, are associated with respective indices, i; the instructions for storing the plurality of modular exponentiations in a lookup table include instructions for storing a modular exponentiation of the plurality of modular exponentiations in the lookup table in association with an index, i, that is associated with the factor, si, upon which the modular exponentiation is based.

Various embodiments additionally include instructions for participating in a digital signature scheme, including: instructions for receiving a message, m, and a signature, s, from the at least one user device; instructions for computing a modular exponentiation of the signature, s, using a public exponent, e, and the cryptographic key modulus, N, to produce a first integer, b; instructions for decoding the first integer, b, to produce a second integer a; instructions for computing a digest, h, of the message, m; and instructions for verifying the message, m, by comparing the digest, h, to the second integer, a.

Various embodiments are described wherein the instructions for participating in a digital signature scheme include: instructions for verifying that the first integer, b, belongs to an encoded domain, V, that is determined based on the factor set S.

Various embodiments described herein relate to a non-transitory machine-readable medium encoded with instructions for encoding a value, h, the non-transitory machine-readable medium including: instructions for determining a factor set, S, to be used for encoding the value, h, wherein the factor set includes a plurality of subsets that are associated with respective digit positions in the value, h; instructions for selecting a plurality of factors from the factor set, S, including: instructions for selecting a subset from the plurality of subsets associated with a digit position, and instructions for selecting a factor from the selected subset based on the digit value of the value, h, at the digit position associated with the selected subset; and instructions for computing a product of the plurality of factors to produce an encoded value.

Various embodiments described herein relate to a device for encoding a value, h, including a memory; and a processor in communication with the memory, the processor being configured to: determine a factor set, S, to be used for encoding the value, h, wherein the factor set includes a plurality of subsets that are associated with respective digit positions in the value, h; select a plurality of factors from the factor set, S, including: selecting a subset from the plurality of subsets associated with a digit position, and selecting a factor from the selected subset based on the digit value of the value, h, at the digit position associated with the selected subset; and compute a product of the plurality of factors to produce an encoded value.

Various embodiments described herein relate to a method for encoding a value, h, the including: determining a factor set, S, to be used for encoding the value, h, wherein the factor set includes a plurality of subsets that are associated with respective digit positions in the value, h; selecting a plurality of factors from the factor set, S, including: selecting a subset from the plurality of subsets associated with a digit position, and instructions for selecting a factor from the selected subset based on the digit value of the value, h, at the digit position associated with the selected subset; and computing a product of the plurality of factors to produce an encoded value.

Various embodiments additionally include further including: instructions for converting the value h to a radix-r representation, wherein the plurality of subsets have respective lengths equal to the radix, r, and the digit positions correspond to radix-r digits of the value h.

Various embodiments are described wherein the factor set, S, includes a set of prime powers including at least one non-prime number.

Various embodiments are described wherein: the factor set, S, is an ordered set, whereby the factors within the factor set, S, are respectively associated with indices; the instructions for selecting a subset from the plurality of subsets associated with a digit position include instructions for multiplying a radix, r, of the value, h, by a first index, i, corresponding to the digit position to obtain a second index, j; and the instructions for selecting a factor from the selected subset based on the digit value of the value, h, at the digit position associated with the selected subset include: instructions for adding, to the second index, j, the digit of the value, h, located at the digit position corresponding to the first index, i, and instructions for retrieving a factor corresponding to the second index, j, within the factor set, S.

Various embodiments additionally include instructions for computing the value, h, as a digest of a message, m, to be digitally signed; instructions for calculating a signature, s, as a modular exponentiation of the encoded value; and instructions for transmitting the message, m, and the signature, s, to another device.

Various embodiments additionally include instructions for performing a modular exponentiation of the encoded value, including: instructions for retrieving a plurality of entries from a previously-stored look-up table, and instructions for computing a product of the plurality of entries.

Various embodiments additionally include instructions for receiving and storing the look-up table from a network server.

Various embodiments described herein relate to a non-transitory machine-readable medium encoded with instructions for encoding a value, h, the non-transitory machine-readable medium including: instructions for determining a factor set, S, and weight, w, to be used for encoding the value, h; instructions for selecting a set, T, of w factors from the factor set, S, to represent the value, h; and instructions for computing a product of the set, T, to produce an encoded value.

Various embodiments described herein relate to a device for encoding a value, h, including a memory; and a processor in communication with the memory, the processor being configured to: determine a factor set, S, and weight, w, to be used for encoding the value, h; select a set, T, of w factors from the factor set, S, to represent the value, h; and compute a product of the set, T, to produce an encoded value.

Various embodiments described herein relate to a method for encoding a value, h, including: determining a factor set, S, and weight, w, to be used for encoding the value, h; selecting a set, T, of w factors from the factor set, S, to represent the value, h; and computing a product of the set, T, to produce an encoded value.

Various embodiments are described wherein the instructions for selecting a set, T, of w factors from the factor set, S, to represent the value, h, include: instructions for applying an unranking function to the value, h, to identify, as the selected set T, the w-subset located at a rank corresponding to the value, h, within the factor set, S.

Various embodiments are described wherein the instructions for applying an unranking function include instructions for selecting the unranking function from a plurality of potential unranking functions based on the value, h.

Various embodiments are described wherein the factor set, S, includes a set of prime powers.

Various embodiments additionally include instructions for computing the value, h, as a digest of a message, m, to be digitally signed; instructions for calculating a signature, s, as a modular exponentiation of the encoded value; and instructions for transmitting the message, m, and the signature, s, to another device.

Various embodiments additionally include instructions for performing a modular exponentiation of the encoded value, including: instructions for retrieving a plurality of entries from a previously-stored look-up table, and instructions for computing a product of the plurality of entries.

Various embodiments described herein relate to a non-transitory machine-readable medium encoded with instructions for execution by a processor for generating a lookup table for performing modular exponentiation, the non-transitory machine-readable medium including: instructions for determining a factor set S associated with an encoding algorithm; instructions for determining a basis factor set, S', of the factor set, S, for use in generating a lookup table; instructions for computing a plurality of modular exponentiations based on respective factors of the basis factor set S', a secret exponent, d, and a cryptographic key modulus, N; instructions for storing the plurality of modular exponentiations in a lookup table; and instructions for transmitting the lookup table to at least one user device.

Various embodiments described herein relate to a device for generating a lookup table for performing modular exponentiation, the device including: a network interface; a memory; and a processor in communication with the network interface and the memory, the processor being configured to: determine a factor set S associated with an encoding algorithm; determine a basis factor set, S', of the factor set, S, for use in generating a lookup table; compute a plurality of modular exponentiations based on respective factors of the basis factor set S', a secret exponent, d, and a cryptographic key modulus, N; store the plurality of modular exponentiations in a lookup table; and transmit, via the network interface, the lookup table to at least one user device.

Various embodiments described herein relate to a method for generating a lookup table for performing modular exponentiation, the method including: determining a factor set S associated with an encoding algorithm; determining a basis factor set, S', of the factor set, S, for use in generating a lookup table; computing a plurality of modular exponentiations based on respective factors of the basis factor set S', a secret exponent, d, and a cryptographic key modulus, N; storing the plurality of modular exponentiations in a lookup table; and transmitting the lookup table to at least one user device.

Various embodiments are described wherein: the factor set, S, includes a set of prime powers, and the basis factor set, S', includes a set of prime numbers from which the prime powers of set S are constructed.

Various embodiments additionally include instructions for participating in a digital signature scheme, including: instructions for receiving a message, m, and a signature, s, from the at least one user device; instructions for computing a modular exponentiation of the signature, s, using a public exponent, e, and the cryptographic key modulus, N, to produce a first integer, b; instructions for decoding the first integer, b, to produce a second integer a; instructions for computing a digest, h, of the message, m; and instructions for verifying the message, m, by comparing the digest, h, to the second integer, a.

Various embodiments are described wherein the instructions for decoding the first integer, b, to produce a second integer a include: instructions for identifying a factor set, S, used for encoding the first integer, b; instructions for identifying a plurality of factors from the factor set, S, included in the first integer, b; instructions for identifying a plurality of indices corresponding to respective ones of the plurality of factors; instructions for deriving a plurality of terms from the plurality of indices; and instructions for computing a sum of the plurality of terms to produce the second integer, a.

Various embodiments are described wherein the instructions for deriving a plurality of terms from the plurality of indices include: instructions for identifying a plurality of sequence identifiers of the plurality of indices, whereby a sequence identifier notes the position of a corresponding index within the plurality of indices when the plurality of indices are ordered; instructions for computing a plurality of residues based on the plurality of indices and a radix, r; instructions for computing a plurality of powers based on raising the radix r to powers corresponding to the plurality of sequence identifiers; and instructions for computing the plurality of terms by computing products of the plurality of residues respectively with the plurality of powers.

Various embodiments are described wherein the instructions for decoding the first integer, b, to produce a second integer a include: instructions for identifying a factor set, S, and weight, w, used for encoding the first integer, b; instructions for identifying a plurality of factors, T, from the factor set, S, included in the first integer, b; instructions for applying a ranking function to plurality of factors, T, to identify, as the second integer, a, the rank of the plurality of factors, T, within the factor set, S.

Additionally various systems are described wherein one or more of the above described methods, devices, or non-transitory media operate in conjunction with each other. For example, such a system may include a method, device, or non-transitory medium for generating a modular exponentiation or encoding a value operating in conjunction with a method, device, or non-transitory medium for generating a lookup table, verifying a modular exponentiation, or decoding a value.

BRIEF DESCRIPTION OF THE DRAWINGS

In order to better understand various embodiments, reference is made to the accompanying drawings, wherein.

To facilitate understanding, identical reference numerals have been used to designate elements having substantially the same or similar structure or substantially the same or similar function.

DETAILED DESCRIPTION

Figure 1:
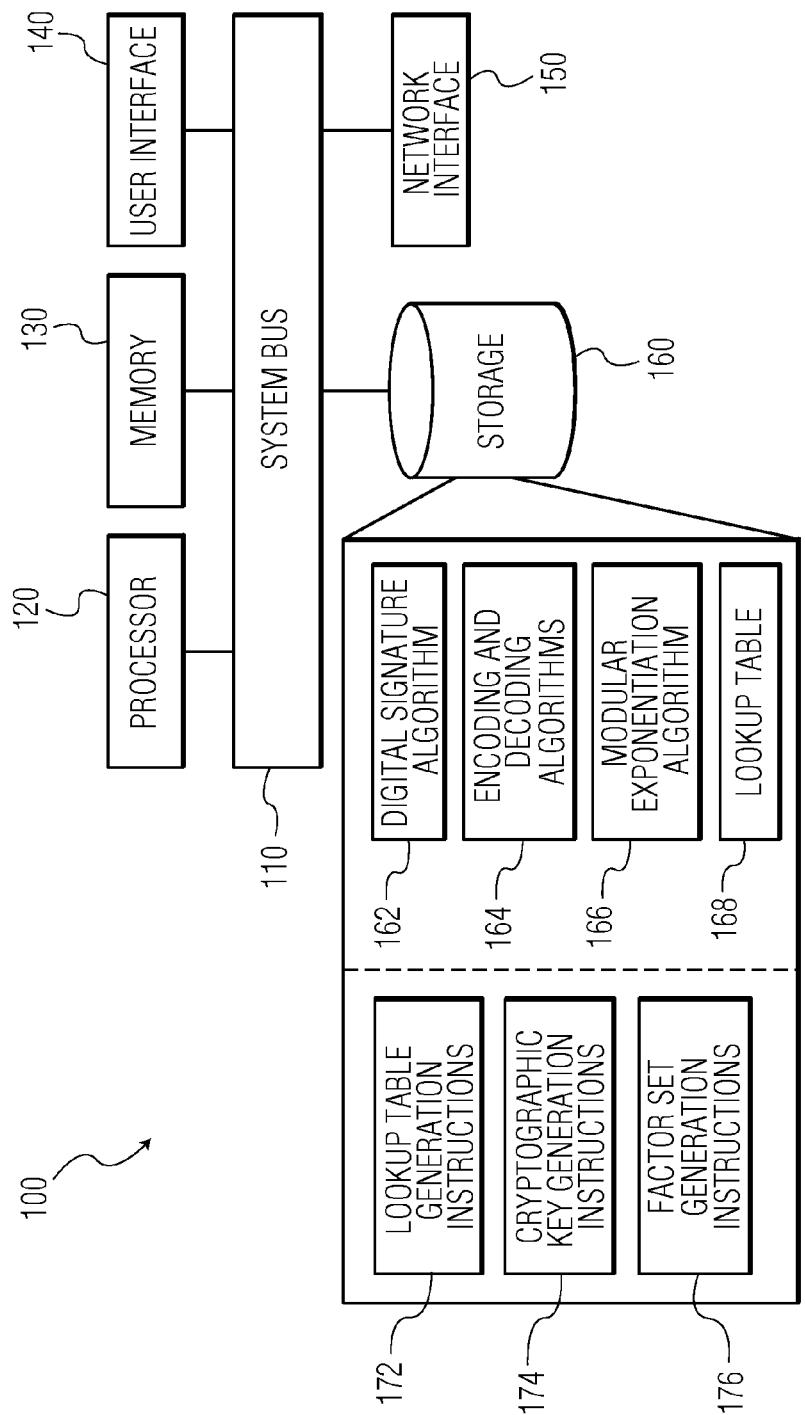
FIG. 1 illustrates an example of a hardware system for implementing the encoding and signature schemes described herein.

The description and drawings presented herein illustrate various principles. It will be appreciated that those skilled in the art will be able to devise various arrangements that, although not explicitly described or shown herein, embody these principles and are included within the scope of this disclosure. As used herein, the term, "or" refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

In view of the growing contexts and applications for encryption, such as applications on untrusted platforms, recent efforts have been devoted to the concept of "white box cryptography," wherein cryptographic schemes are developed to be secure even when the cryptographic implementation is laid open to an attacker. White-box cryptography is concerned with the design and analysis of software implementations of cryptographic algorithms engineered to execute on untrusted platforms. Particularly, this is the scenario where the user of a particular device can decrypt messages (with a secret key) which are encrypted with his public key but is unable to extract or derive sufficient information to recover this secret key. Furthermore, it is assumed in such implementations that the user can be the attacker: e.g. the attacker has full access to the software implementation, can pause, alter and resume the execution of the software implementation at any time For example, in digital rights management systems, it is desirable to provide a content-consumer with the ability to easily authenticate themselves as a party that is entitled to access the content. It is also desirable, however, to prevent that content-consumer from sharing credentials with other parties for the purpose of provided those other parties with access to the same content that is only licensed to that original content-consumer.

One white-box approach to this scenario is to provide the content-consumer with the ability to digitally sign messages using a private key, d, assigned to the content-consumer without actually giving the private key, d, to the content-consumer. To that end, the content-consumer may be provided, instead, with a lookup table of pre-computed exponentiated values based on the private key, d. In various systems, for example, the look-up table may be provided to the content-consumer by, for example, a central digital rights management server for use in authenticating the content-consumer to one or more media servers serving the protected content. The content-consumer may then use this lookup table to compute digital signatures in spite of not knowing the value of their private key, d. It would be desirable to build upon these efforts to simplify the scheme and reduce the resources devoted to execution such as, for example, reducing the size of the look-up table.

It will be appreciated that, while various examples described herein are explained in the context of digital signature schemes, various aspects described herein may be adapted to data encryption schemes wherein data is encrypted with a public key and retrieved using a private key.

FIG. 1 illustrates an example of a hardware system 100 for implementing the encoding and signature schemes or the lookup table generation schemes described herein. The hardware system 100 may correspond to virtually any device that may participate in a digital signature scheme such as, for example, a personal computer, laptop, tablet, mobile communications device, server, blade, smart card, near field communication (NFC) device, or other device. For example, the hardware system may correspond to a set-top box for receiving and rendering digital content or a server for providing digital content. Various applications of the method described herein will be apparent such as, for example, digital rights management (DRM), banking applications, and generally protecting cryptographic keys in devices such as mobile phones and television set-top boxes.

As shown, the device 100 includes a processor 120, memory 130, user interface 140, network interface 150, and storage 160 interconnected via one or more system buses 110. It will be understood that FIG. 1 constitutes, in some respects, an abstraction and that the actual organization of the components of the device 100 may be more complex than illustrated.

The processor 120 may be any hardware device capable of executing instructions stored in the memory 130 or the storage 150. As such, the processor may include a microprocessor, field programmable gate array (FPGA), application-specific integrated circuit (ASIC), or other similar devices.

The memory 130 may include various memories such as, for example L1, L2, or L3 cache or system memory. As such, the memory 130 may include static random access memory (SRAM), dynamic RAM (DRAM), flash memory, read only memory (ROM), or other similar memory devices.

The user interface 140 may include one or more devices for enabling communication with a user such as an administrator. For example, the user interface 140 may include a display, a mouse, and a keyboard for receiving user commands. In some embodiments, the user interface 140 may include a command line interface or graphical user interface that may be presented to a remote terminal via the network interface 150.

The network interface 150 may include one or more devices for enabling communication with other hardware devices. For example, the network interface 150 may include a network interface card (NIC) configured to communicate according to the Ethernet protocol. Additionally, the network interface 150 may implement a TCP/IP stack for communication according to the TCP/IP protocols. Various alternative or additional hardware or configurations for the network interface 150 will be apparent.

The storage 160 may include one or more machine-readable storage media such as read-only memory (ROM), random-access memory (RAM), magnetic disk storage media, optical storage media, flash-memory devices, or similar storage media. In various embodiments, the storage 160 may store instructions for execution by the processor 120 or data upon with the processor 120 may operate.

For example, where the hardware device 100 implements a user device, the storage 160 includes a digital signature algorithm for generating digital signatures used to verify the identity of the hardware device or a user thereof or for verifying digital signatures received from other devices. To support the digital signature algorithm 162, the storage 160 also includes an encoding or decoding algorithm 164 and a modular exponentiation algorithm 166. As will be understood and explained in greater detail below by way of various examples, the encoding algorithm 164 translates an initial value to belong to a set upon which the modular exponentiation algorithm 166 operates, while the decoding algorithm 164 translates a value in this encoding set back to a value in the original set (such as, for example, the set of integers). The modular exponentiation algorithm 166 computes a modular exponentiation equivalent to residue using a cryptographic key modulus, N, of an encoded value raised to a power of a secret exponent, d, or a public exponent, e (depending on whether a signature is being computed or verified, respectively). In various embodiments following a white-box cryptography approach, the modular exponentiation algorithm 166 does not have access to the secret exponent, d, and instead the storage 160 includes a lookup table 168 that can be used by the modular exponentiation algorithm 166 to perform its function as described in various examples below.

Where the hardware device 100 implements a content server or other server for distributing lookup tables, the storage includes lookup table generation instructions 172. These instructions 172 may utilize a cryptographic key (including the secret exponent, d) and a factor set S used for creating an encoding domain V to precompute modular exponentiations of the factors such that a device without access to the secret exponent, d, may nonetheless use the precomputed modular exponentiations to construct a modular exponentiation of any encoded value belonging to the encoding domain, V. In some such embodiments, the device 100 may also generate the cryptographic key or factor set and, as such, the storage 160 may store cryptographic key generation instructions 174 or factor set generation instructions 176. It will be appreciated that, in some embodiments, the cryptographic keys or factor sets may be unique to each user, may be constant across all users, or some combination thereof. Further, in some embodiments, the content server or other server may also participate in a digital signature scheme (e.g., verifying the identity to a device to which a lookup table was previously transmitted) and as such may also include the digital signature algorithm 162, encoding/decoding algorithm 164, and modular exponentiation algorithm 166.

It will be apparent that various information described as stored in the storage 160 may be additionally or alternatively stored in the memory 130. In this respect, the memory 130 may also be considered to constitute a "storage device" and the storage 160 may be considered a "memory." Various other arrangements will be apparent. Further, the memory 130 and storage 160 may both be considered to be "non-transitory machine-readable media." As used herein, the term "non-transitory" will be understood to exclude transitory signals but to include all forms of storage, including both volatile and non-volatile memories.

While the hardware device 100 is shown as including one of each described component, the various components may be duplicated in various embodiments. For example, the processor 120 may include multiple microprocessors that are configured to independently execute the methods described herein or are configured to perform steps or subroutines of the methods described herein such that the multiple processors cooperate to achieve the functionality described herein. In other embodiments, such as those embodiments wherein the device 100 is implemented in a cloud computing environment, the various components may be physically located in diverse machines. For example, the processor 120 may include a first microprocessor in a first data center server and a second microprocessor in a second data center server. Various additional arrangements will be apparent.

Figure 2:
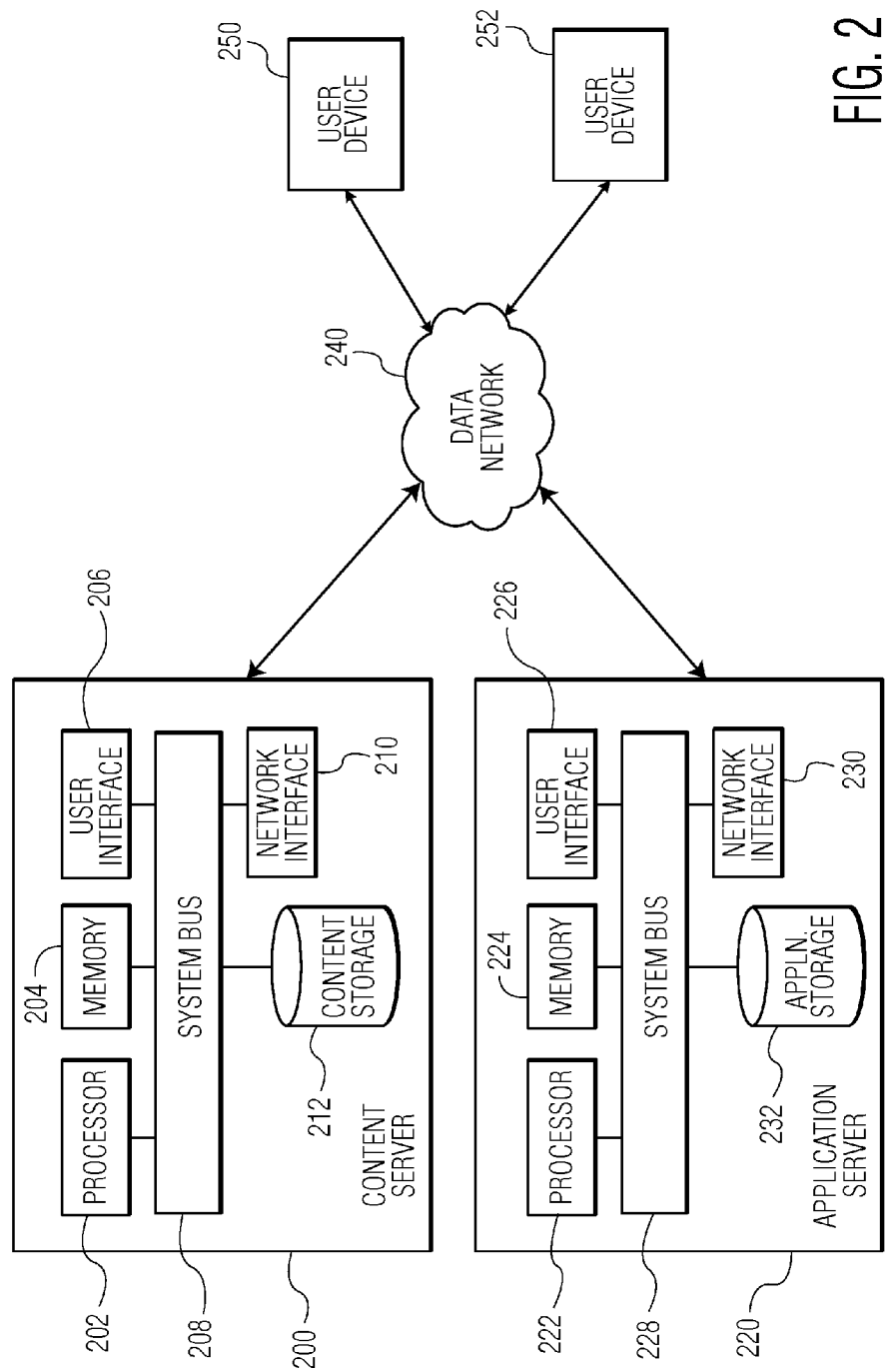
FIG. 2 illustrates an example of a system for providing a user device secure content and a software application that processes the secure content.

FIG. 2 illustrates an example of a system for providing a user device secure content and a software application that processes the secure content. The system includes a content server 200, application server 220, user devices 250, 252, and a data network 240. The user devices 250, 252 may request access to secure content provided by the content server 200 via data network 240. The data network can be any data network providing connectivity between the user devices 250, 252 and the content server 200 and application server 220. The user devices 250, 252 may be one of a plurality of devices, for example, set top boxes, media streamers, digital video recorders, tablets, mobile phones, laptop computers, portable media devices, smart watches, desktop computers, media servers, etc.

The user request for access may first require the downloading of a software application that may be used to process the secure content provided by the content server 200. The software application may be downloaded from the application server 220. The software application may be obscured using the techniques described above as well as operate as described above. Once the user devices 250, 252 install the software application, the user device may then download secure content from the content server 200 and access the secure content using the downloaded software application. For example, the downloaded software application may perform decryption of encrypted content received from the content server. In other embodiments, the software application may perform other secure operations, such as for example, encryption, digital signature generation and verification, etc.

The content server 200 may control the access to the secure content provided to the user devices 250, 252. As a result when the content server 200 receives a request for secure content, the content server 200 may transmit the secure content to the requesting user device Likewise, the application server 220 may control access to the software application provided to the user devices 250, 252. As a result when the content server 220 receives a request for the software application, the application server 220 may transmit the software application to the requesting user device. A user device requesting the software application or secure content may also be authenticated by the respective servers, before providing the software application or secure content to the user device.

The content server 200 may include a processor 202, memory 204, user interface 206, network interface 210, and content storage 212 interconnected via one or more system buses 208. It will be understood that FIG. 2 constitutes, in some respects, an abstraction and that the actual organization of the components of the device 200 may be more complex than illustrated.

The processor 202 may be any hardware device capable of executing instructions stored in memory 204 or storage 212. As such, the processor may include a microprocessor, field programmable gate array (FPGA), application-specific integrated circuit (ASIC), or other similar devices.

The memory 204 may include various memories such as, for example L1, L2, or L3 cache or system memory. As such, the memory 204 may include static random access memory (SRAM), dynamic RAM (DRAM), flash memory, read only memory (ROM), or other similar memory devices.

The user interface 206 may include one or more devices for enabling communication with a user such as an administrator. For example, the user interface 206 may include a display, a mouse, and a keyboard for receiving user commands.

The network interface 210 may include one or more devices for enabling communication with other hardware devices. For example, the network interface 210 may include a network interface card (NIC) configured to communicate according to the Ethernet protocol. Additionally, the network interface 210 may implement a TCP/IP stack for communication according to the TCP/IP protocols. Various alternative or additional hardware or configurations for the network interface 210 will be apparent.

The content storage 212 may include one or more machine-readable content storage media such as read-only memory (ROM), random-access memory (RAM), magnetic disk storage media, optical storage media, flash-memory devices, or similar storage media. In various embodiments, the content storage 212 may store content to be provided to users.

The application server 220 includes elements like those in the content server 200 and the description of the like elements in the content server 200 apply to the application server 220. Also, the content storage 722 is replaced by application storage 232. Further, it is noted that the content server and applications server may be implemented on a single server. Also, such servers may be implemented on distributed computer systems as well as on cloud computer systems.

As will be understood, the modular exponentiation, encoding, or digital signature methods described herein may be deployed and utilized within the system of FIG. 2 or similar systems in various manners. For example, the user devices 250, 252 may be provided by a manufacturer or other seller preconfigured to transmit signed messages to the content server 200 to request the provision of content. Alternatively, the user devices 250, 252 may not be fully preconfigured for such operation; instead, the application server 220 may communicate with the user devices 250, 252 to effect such configuration. For example, the application server may transmit code instructions for implementing the methods described herein or data defining one or more lookup tables.

Figure 3:
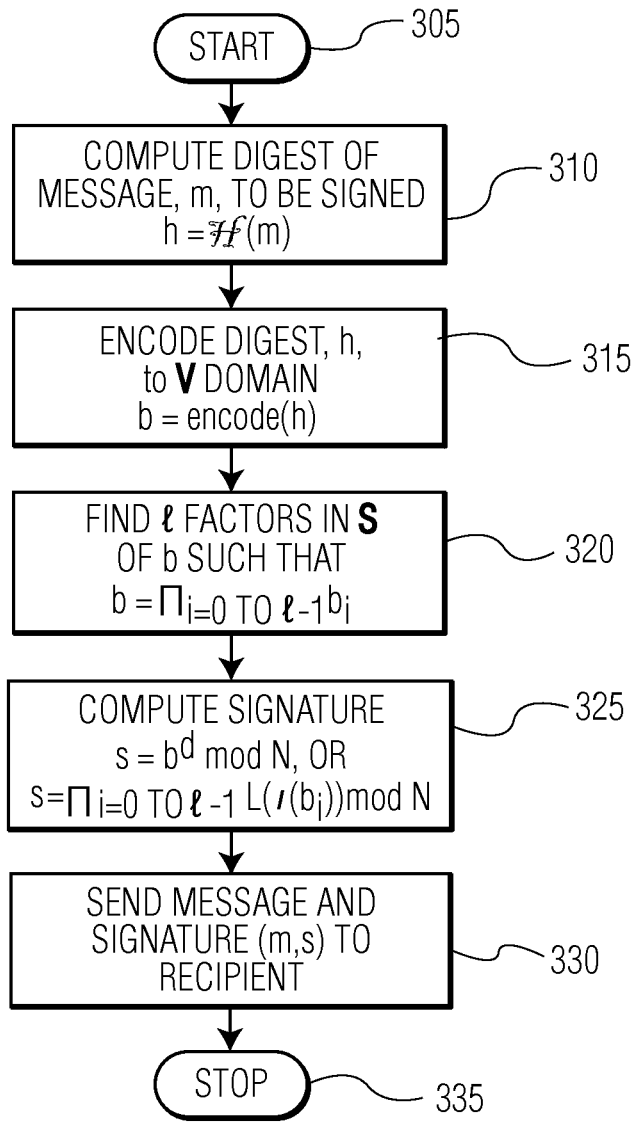
FIG. 3 illustrates an example of a method for digitally signing a message.

FIG. 3 illustrates an example of a method 300 for digitally signing a message. The method 300 may correspond to the digital signature algorithm 162 of FIG. 1. For example, in embodiments where a device requests content deliver, the device may execute a method such as method 300 to digitally sign the request message to prove the requestor's identity. Various alternative contexts for performing a digital signature method such as method 300 will be apparent.

The method begins in step 305 and proceeds to step 310 where the device computes a digest, h, of a message, m, to be signed. For example, the message may be a request message requesting the delivery of content to the device. The digest may be computed according to any method such as applying a hash function to the entire message, $\mathcal{H}(m)$. Alternatively, in some embodiments, the full, non-digested method may be used for the digital signature, in which case step 310 may be omitted.

Next, in step 315, the device encodes the digest (or other value), h, into an encoding domain, V, within which the following modular exponentiation steps are configured to operate. Specifically, according to various embodiments, the encoding domain, V, is defined or generated based on a pre-chosen factor set, S. The factor set S, may be, for example, a set of prime numbers, a set of prime powers, a set of numbers that are co-prime with respect to each other, or an arbitrary set of integers. Various tradeoffs between selections for the factor set S will be apparent in view of the present disclosure. For example, a set of prime numbers may provide greater defense against "false positive" signature verifications than a set of arbitrary integers that are not co-prime, but may also require a larger look-up table to be precomputed and stored. Given such a factor set, S, the encoding domain may be defined as any integer that may be constructed as a product of factors in S, $$V = \left\{ v = \prod_i v_i^{\alpha_i} \;\middle|\; v_i \in S, 0 \leq \alpha_i \in \mathbb{Z}, v < N \right\},$$

where N is the modulus for the cryptographic key. For example, given the factor set S={2, 3, 5}, it can be shown that $50 \in V$ because $50=2^1*5^2$. On the other hand, 70 does not fall within this example encoding domain V because one of its prime factors, 7, is neither an element of S nor a factor of an element in S. Various encoding algorithms may be utilized for step 315 to achieve conversion of a value, $h \in \mathbb{Z}$, to an encoded value, $b \in V$. Various example encoding methods will be described in greater detail below with respect to FIGS. 6, 8, and 10.

In step 320, the device identifies the $\ell$ factors of the encoded value, b, within the factor set S, such that $$b = \prod_{i=0}^{\ell-1} b_i.$$

For example, given an encoded value, b, the device may utilize trial division to identify which factors in S are factors of b. In other embodiments, such as embodiments where the encoding algorithm selects factors in S in step 315, the factors may already be provided in step 320. For example, the encoding algorithm may share the selected factors forward for use in the remaining steps of the method 300. Alternatively, in some embodiments, the encoding and modular exponentiation algorithms may be combined such that, as factors are selected for the original value, they are modular exponentiated (e.g., entirely through computation or with reference to a lookup table) and only then combined into a product.

Next, in step 325, the device computes the signature, s, as the modular exponentiation of the encoded value. Where the device has access to the secret exponent, d, the device may compute the modular exponentiation entirely as, $$s = b^d \bmod N = \prod_{i=0}^{\ell-1} b_i^d \bmod N.$$

In other words, the device may compute the modular exponentiation of each factor in the factor set S of b and then compute the product of these resulting values. Alternatively, where the device is not provided with the value of the secret exponent, d, and is instead provided with a precomputed lookup table of the modular exponentiations of each factor in S, the device may instead compute the product of the lookup table entries corresponding to the $\ell$ factors of the encoded value, b. For example, given a lookup table, L, and an index function $\ell$ (x) that returns, for a factor x, the index of the factor within the factor set, S, (or, simply given the indices of the $\ell$ factors), the device may compute the modular exponentiation as $$s = \prod_{i=0}^{\ell-1} L(\iota(b_i)) \bmod N.$$

Having computed the signature, s, the device then transmits the signature, s, together with the message, m, to a recipient such as, in the case of a content request, to a content server. The method 300 then proceeds to end in step 335.

After receiving a message and signature pair, the recipient device may proceed to verify the signature. For example, where the recipient device is a content server, the server may verify the signature and begin serving content only if the signature is verified. Various other contexts and consequences for signature verification will be apparent.

Figure 4:
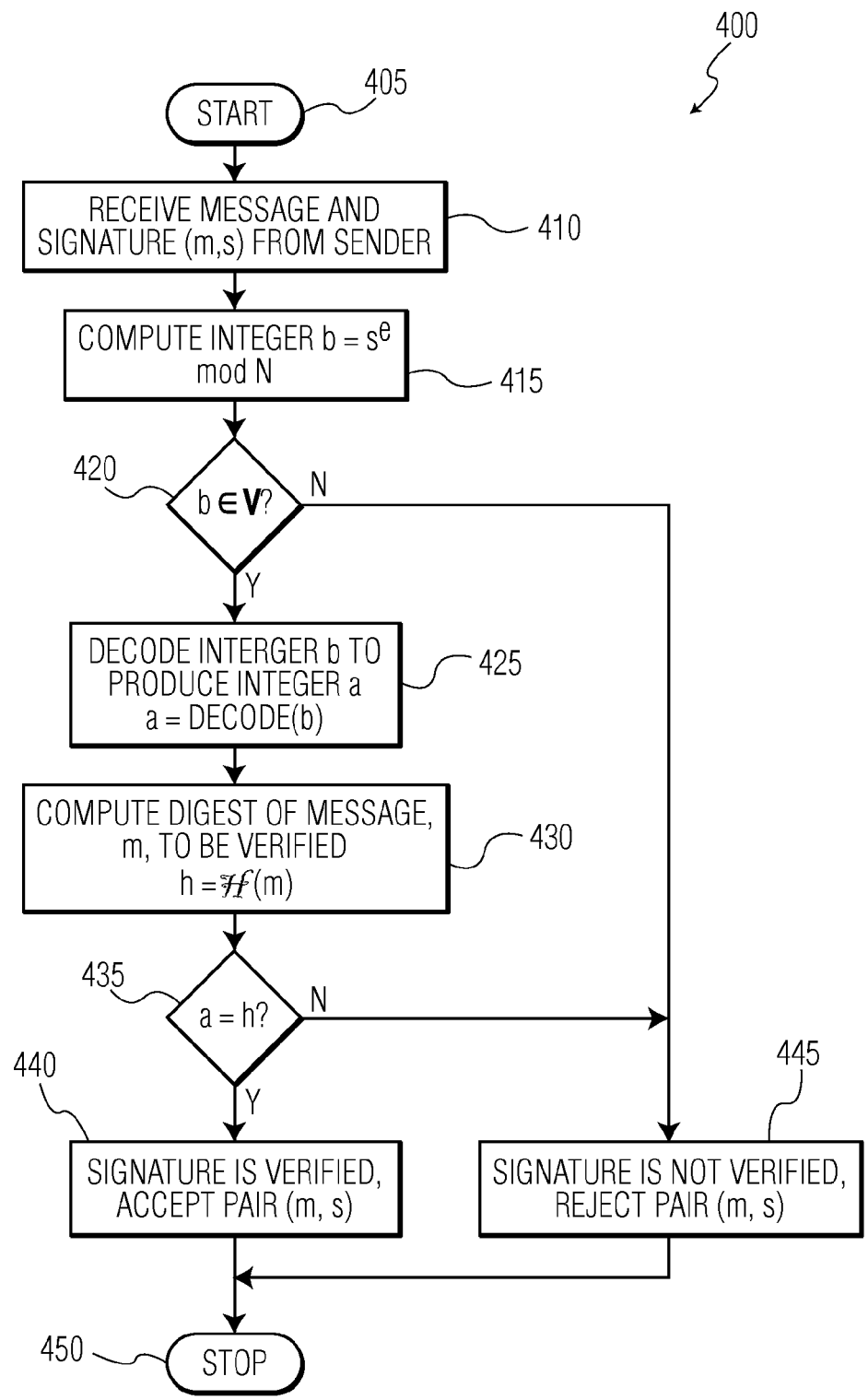
FIG. 4 illustrates an example of a method for verifying a digital signature.

FIG. 4 illustrates an example of a method 400 for verifying a digital signature. The method 300 may correspond to the digital signature algorithm 162 of FIG. 1. The method 400 may operate in conjunction with the method 300 (or a method similar thereto) and, to enable such complementary operation, the two methods may be implemented with a priori agreement as to the factor set, S, encoding domain, V, encoding/decoding algorithm pairs (which, themselves, may be complementary algorithms), hash functions, or public elements of the cryptographic key, <e, N>.

The method 400 begins in step 405 and proceeds to step 410 where the device receives a message and signature from a sending device. For example, the signature, s, may be generated and transmitted to the device by a sending device executing the method 300 or a method similar thereto. Next, in step 415, the device computes the modular exponentiation of the signature to produce the encoded value b. As will be understood, when the signature, s, computed by method 300 is again used for a modular exponentiation but with the public exponent, e, instead of the private exponent, d, the original, pre-modular exponentiation value, b, will be recovered (as long as the exponents d and e are a matching pair). The modular exponentiation in step 415 may be computed according to any method such as straightforward mathematical computation, computation of modular exponentiations of the prime factors of the signature, or even reference to a separate lookup table precomputed with modular exponentiations based on the public exponent e for all prime numbers less than N.

In step 420, the device determines whether the recovered value b belongs to the encoding domain V. For example, the device may determine, using trial division, whether the value, b, can be constructed using factors from the factor set, S. If the recovered value, b, does not belong to the encoding domain, V, the method 400 proceeds to step 445 where the device determines that the signature is determine to not be verified. Otherwise, the method 400 proceeds to step 425.

In step 425, the device decodes the integer, b, using a decoding algorithm to produce an integer, a. As with the encoding step 315 of method 300, the decoding step 425 may utilize virtually any method to translate an encoded value, b ∈ V, to an unencoded value, a ∈ ℤ that complements the encoding method used in creating the signature s such that DECODE(ENCODE(x))=x.

Various examples of decoding methods will be described in greater detail below with respect to FIGS. 7, 9, and 11.

In step 430, the device computes the digest of the message, m, to produce a value, h. As with the digest step 310 of method 300, the digest function may be virtually any function such as a preselected and agreed-upon hash function. Alternatively, where no digest is computed, the message m may be taken as-is as the value h. In step 435, the device determines whether the recovered value a matches the digest value, h. If not, the method proceeds to step 445 where the device determines that the signature cannot be verified. Otherwise, the method proceeds to step 440 where the device determines that the signature is verified and accepts the message pair as authentic (e.g. to proceed in responding to a request contained in the message). After making a determination as to verification in step 440 or 445, the method proceeds to end in step 450.

Figure 5:
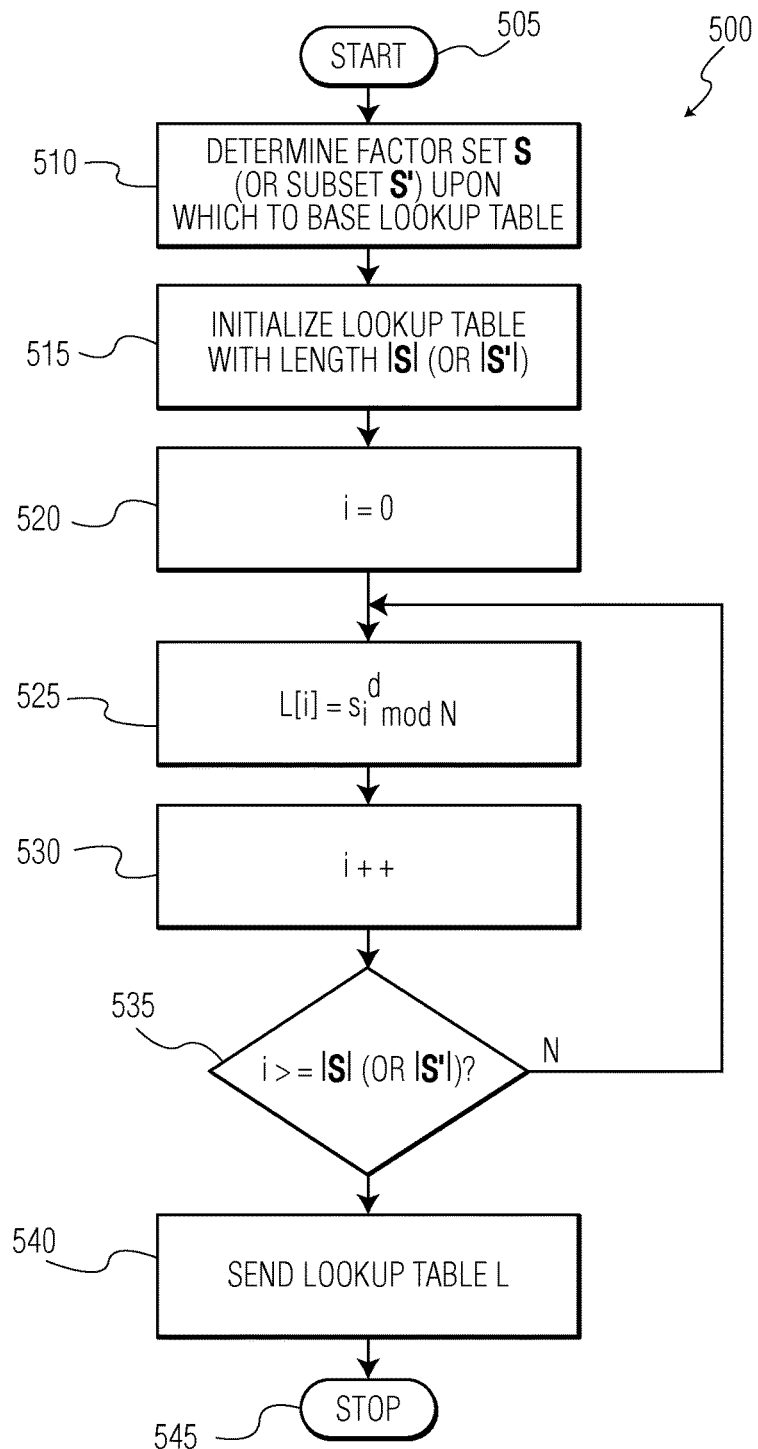
FIG. 5 illustrates an example of a method for generating a lookup table.

FIG. 5 illustrates an example of a method 500 for generating a lookup table to be used in a digital signature generation method such as method 300. Various modifications for generating a lookup table for use in a digital signature verification method such as method 400 will be apparent. The method 500 may correspond to the lookup table generation instructions 172 of FIG. 1. In various embodiments, the method 500 may generate the lookup table based on various values that will be used by the method 300 or 400. For example, the method 500 may be provided with the cryptographic key <e,d,N>, factor set, S, encoding domain, V, encoding/decoding method pairs, etc.

The method 500 begins in step 505 and proceeds to step 510 where the device determines a factor set, S, that will be used in the digital signature scheme and upon which to base the lookup table. In some embodiments, this step may alternatively determine a subset of the factor set, S', upon which to base the lookup table. Specifically, where some factors within the set S are themselves products of other factors in the set, S, these factors may be omitted from the lookup table because they may simply be reconstructed from the smaller factors. For example, in some embodiments, the set, S, may be include factors that are not prime. Consider the case S={2,3,4,5,7}. In constructing the lookup table, the device may instead utilize the subset S'={2,3,5,7} because 4 can be constructed from 2(4=$2^2$) leaving the lookup table entry for 4 potentially redundant. In other embodiments, the device may nonetheless include such redundant entries in the lookup table. It will be appreciated that removing such redundant entries results in a tradeoff between lookup table size and computational efficiency.

In yet another alternative embodiment, the lookup table may be generated based on a set S' that includes one or more element that is not a member of S. For example, consider the case where S={$2^2$, $3^2$, $2^4$, $5^2$, $7^2$}={4, 9, 16, 25, 49}. While a lookup table can be generated based on S with 5 elements, a lookup table may alternatively be generated with 4 elements based on S'={2, 3, 5, 7}. Either table could be used to accurately compute modular exponentiations. In both such embodiments, S' may be referred to as a basis factor set for the factor set S.

For the sake of brevity, as used herein with reference to lookup table generation, the set chosen as a basis for the lookup table will be referred to as S, regardless of whether this is the full factor set or a subset thereof. Various modifications for enabling computation of the lookup table based on the subset of factors will be apparent.

In step 515, the device initializes a new lookup table with an entry for each element in the factor set S. Then, in step 520, the device initializes an index to a starting value of 0. Then, in step 525, the device sets the value of the current lookup table entry. Specifically, the device calculates the modular exponentiation of the $i^{th}$ element in S using the secret exponent, d, and cryptographic key modulus, N. The device then sets the $i^{th}$ entry of the lookup table, L[i], equal to the computed value. Then, in step 530, the device increments the index, i.

In step 535, the device determines whether the last factor in S has been processed, yielding a complete lookup table. For example, the device may determine whether i now equals (or is somehow greater than) the length of S. If not, the method 500 loops back to step 525 where the next lookup table entry may be calculated. Otherwise, the method 500 proceeds to step 540 where the device sends the lookup table L to one or more devices for use in performing modular exponentiations as part of, for example, a digital signature method such as method 300. The method 500 then proceeds to end in step 545.

As noted above, the modular exponentiation schemes described herein may be used in conjunction with various encoding and decoding methods. According to a first example, an encoding function may, given an x-bit integer, compute a B-smooth output (for a suitably chosen maximum prime number, B). According to this example, the set S is chosen as an ordered subset of the prime numbers up to B:

$$S=\{s_i\} \text{ where } s_i \text{ is prime, } s_i \leq B, \text{ and } s_i < s_j \text{ whenever } i<j$$

The first example encoding function may then be defined for an x-bit integer h in the radix-2 representation as $$\text{ENCODE}\left(h = \sum_{i=0}^{x-1} h_i 2^i\right) = \prod_{i=0}^{x-1} s_i^{h_i}.$$

Thus, the first example encoding method computes the product of a subset of the primes up to B depending of the bit representation of h. The first example of a decoding function may then be defined as $$\text{DECODE}\left(s = \prod_{i=0}^{x-1} s_i^{f_i}\right) = \sum_{i=0}^{x-1} f_i 2^i.$$

Thus, the first example decoding method determines which factors from S are included in the encoded value and setting the bits based on the identified factors. The value of B may be chosen, in some embodiments, such that the product of the factors in S does not exceed the encryption modulus N that will be used in conjunction with the subsequent modular exponentiation of the encoded value.

As an alternative to the first example, the same encoding and decoding methods may be used for a different factor set. For example, the set S may be instead defined as a set of prime powers:

$$S=\{p^{2^\alpha} | \text{prime } p \leq B, \alpha \in \mathbb{Z}_{\geq 0}\}.$$

The set S may then be restricted to the subset $S_K \subseteq S$ consisting of the first $K \leq |S|$ elements $s_i$ of S, with $s_0 < s_1 < \ldots < s_{k-1}$. This specific set will be hereinafter referred to as the "prime-square-powers" factor set.

Figure 6:
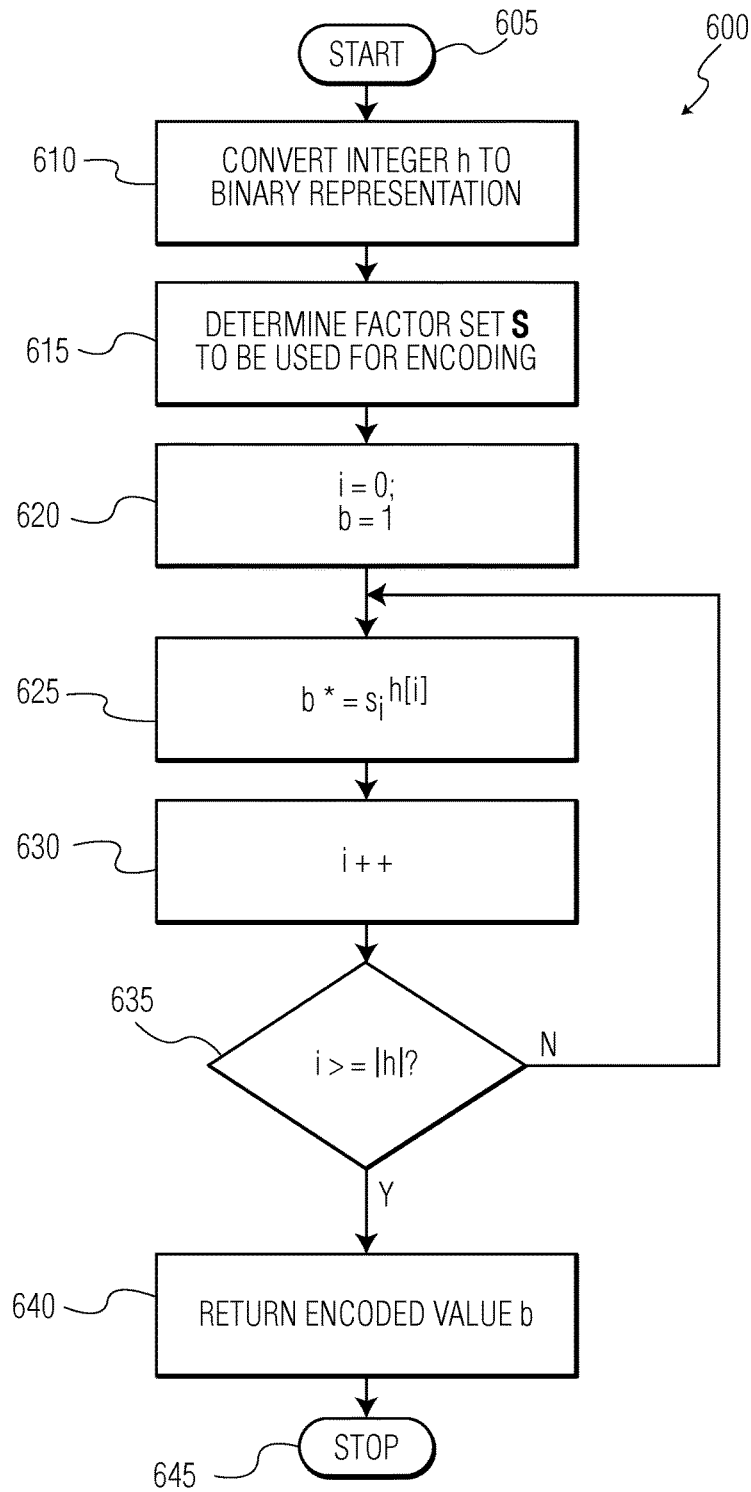
FIG. 6 illustrates a first example of an encoding method.

FIG. 6 illustrates an example implementation of this first example of an encoding method 600. This method may correspond to the encoding algorithm 164 of FIG. 1 and may be called in step 315 of the digital signature generation method 300. Alternatively, the encoding method 600 may be used in various other contexts outside of the digital signature or modular exponentiation methods described herein.

The method begins in step 605 and proceeds to step 610 where the device converts the value to be encoded, h, into a binary representation. Alternatively, in various embodiments the integer, h, may already be represented in binary form and require no further conversion; in such embodiments, step 610 may be omitted.

Next, in step 615, the device may determine a factor set, S, to be used to for encoding. For example, the factor set, S, may be predetermined by hardcoding into the method 600, retrieved from memory, or received from another device such as a content server. For example, the factor set S may be the set of the first x primes or the set of the first x prime powers according to a prime power scheme such as the one described above. Various alternative sets for use as the factor set S will be apparent. The device then initializes the encoded value, b, and the current index, i, in step 620.

Upon entering the loop of the method 600, the device incorporates a term into the working encoded value, b. As shown, the current value of b (initialized to 1) is multiplied by a factor corresponding to the current index raised to the power of the binary digit (i.e., bit) of the integer h at the bit position corresponding to the current index. In other words, when the current bit is '1,' a factor in S corresponding to the bit position is incorporated into the working encoded value; otherwise, the encoded value is not altered based on the current bit positions. Various alternate manners of modifying the encoded value based on the integer h will be apparent. For example, by doubling the size of S, each bit position could be associated with two potential factors: a factor $s_{2i}$, to be incorporated when h[i] is 0 and a factor $s_{2i+1}$ to be incorporated when h[i] is 1.

After considering the current bit position and potentially updating the encoded value, b, the device increments the index in step 630. Next, in step 635, the device determines whether the method 600 has processed the last bit in the integer h. For example, the device may determine whether the current index is now equal to (or somehow greater than) the number of bits in h. If not, the method 600 loops back to step 625 to consider the next bit position. Otherwise, the method 600 proceeds to return the encoded value, b, in step 640 to the requesting method such as, for example, the digital signature generation method 300. The method then proceeds to end in step 645.

Figure 7:
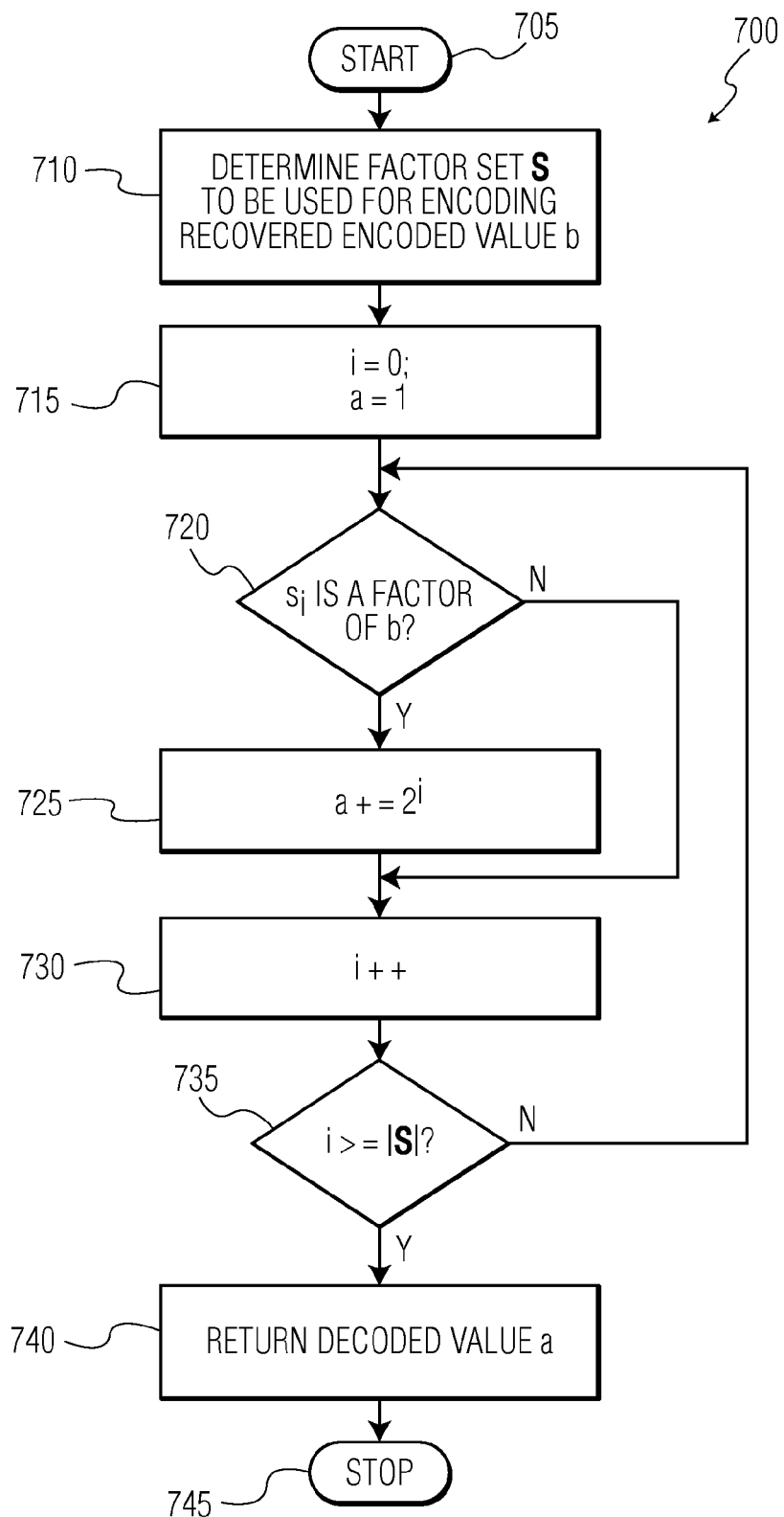
FIG. 7 illustrates a first example of a decoding method.

FIG. 7 illustrates an example implementation of the first example of a decoding method 700. This method may correspond to the decoding algorithm 164 of FIG. 1 and may be called in step 425 of the digital signature verification method 400. Alternatively, the decoding method 700 may be used in various other contexts outside of the digital signature or modular exponentiation methods described herein.

The method 700 begins in step 705 and proceeds to step 710 where the device determines the factor set S that was used for encoding a value b to be decoded. For example, where the method 700 is implemented to operate in conjunction with the example encoding method 600, the set S may be preconfigured to be used. Then, in step 715, the device initializes an index, i, and a working decoded value, a. Next, in step 720, the device determines whether the $i^{th}$ element of S is a factor of the encoded value b, for example, by trial division. If not, the method skips ahead to step 730. Otherwise, the method proceeds to step 725 where the device sets the bit of the working decoded value, a, that corresponds to the $s_i$ factor. For example, as shown, the device simply adds $2^i$ to the working value.

After considering the $i^{th}$ factor of S, the device increments i in step 730. Then, in step 730, the device determines whether the all factors in S have been considered. For example, the device may determine whether i is equal to (or somehow greater than) the number of factors in S. If not, the method loops back to step 720 to consider the next factor. Otherwise, decoding is finished and the method 700 returns the decoded value, a, to the requestor in step 740 such as, for example, a digital signature verification method such as method 400. The method then proceeds to end in step 745.

According to a second example, an integer to be encoded is represented in a radix-r representation as $$a = \sum_{i=0}^{n_r-1} a_i r^i, 0 \le a_i < r,$$

where the number of radix-r digits, $n_r$, can be determined from encoding width, n, as $$n_r = \left\lceil \frac{n}{\log_2(r)} \right\rceil.$$

The second example encoding method also selects a factor set, S, of sufficient length such that each radix-r digit of the encoded value may be assigned any of r factors unique for that digit position. For example, in a radix-16 implementation that is capable of encoding 32 hexadecimal digits, the factor set, S, is chosen to have at least 512 factors (i.e., 16 factors for each of the 32 digits). Given this set, the second example encoding method may be defined as $$\text{ENCODE}(a) = \prod_{i=0}^{n_r-1} s_{ir+a_i}.$$

Thus, the factor set, S, includes a subset of factors for each digit position and, for each digit position in the value to be encoded, a factor corresponding to the digit value is selected from the appropriate subset for inclusion in the encoded product.

Given a B-smooth integer, $$v = \prod_{i=0}^{n_r-1} s_{u_i},$$

with $0 \le u_0 < \ldots < u_{n[r]-1} < K$, a corresponding decoding function may be defined as $$\text{DECODE}(v) = \sum_{i=0}^{n_r-1} (u_i \bmod r) r^i.$$

In other words, for encoding the first radix-r digit of a, the encoding method picks the $a_0^{th}$ element in the sequence $s_0, s_1, \ldots, s_{r-1}$, then the $a_1^{th}$ element in the sequence $s_r, s_{r+1}, \ldots, s_{2r-1}$, and so on. For each digit to encode, the second example uses r extra factors in S. Encoding an n-bit integer thus uses $K=n_r r$ factors s. The decoding is possible where v exists in the encoding domain V, $$V = \left\{ \prod_{i=0}^{n_r-1} s_{ir+a_i} < N : 0 \le a_i < r \right\}.$$

For a factor set S defined above as the set of prime-square-powers and a given modulus size and B, the maximum encoding width may be determined by the greatest n such that $$\text{ENCODE}\left(r^{\left\lceil \frac{n}{\log_2(r)} \right\rceil} - 1\right) < N.$$

For example, for a 1024-bit modulus N, Table 1 shows the maximum width that is achievable for various radices r (restricted to powers of 2); and then shows example choices of parameters for encoding width n, with an aim to minimize the number of entries k in the lookup table L. Note that the smallest k may be obtained by the smallest radix that can encode a given width.

TABLE 1

| width n | radix r | k | $B = p_k$ | K |
|---|---|---|---|---|
| 118 | $2^1$ | 220 | 1373 | 236 |
| 210 | $2^2$ | 381 | 2741 | 420 |
| 285 | $2^3$ | 718 | 5437 | 760 |
| 344 | $2^4$ | 1287 | 10529 | 1376 |
| 395 | $2^5$ | 2390 | 21277 | 2528 |
| 128 | $2^2$ | 86 | 443 | 256 |
| 256 | $2^3$ | 500 | 3571 | 688 |

Figure 8:
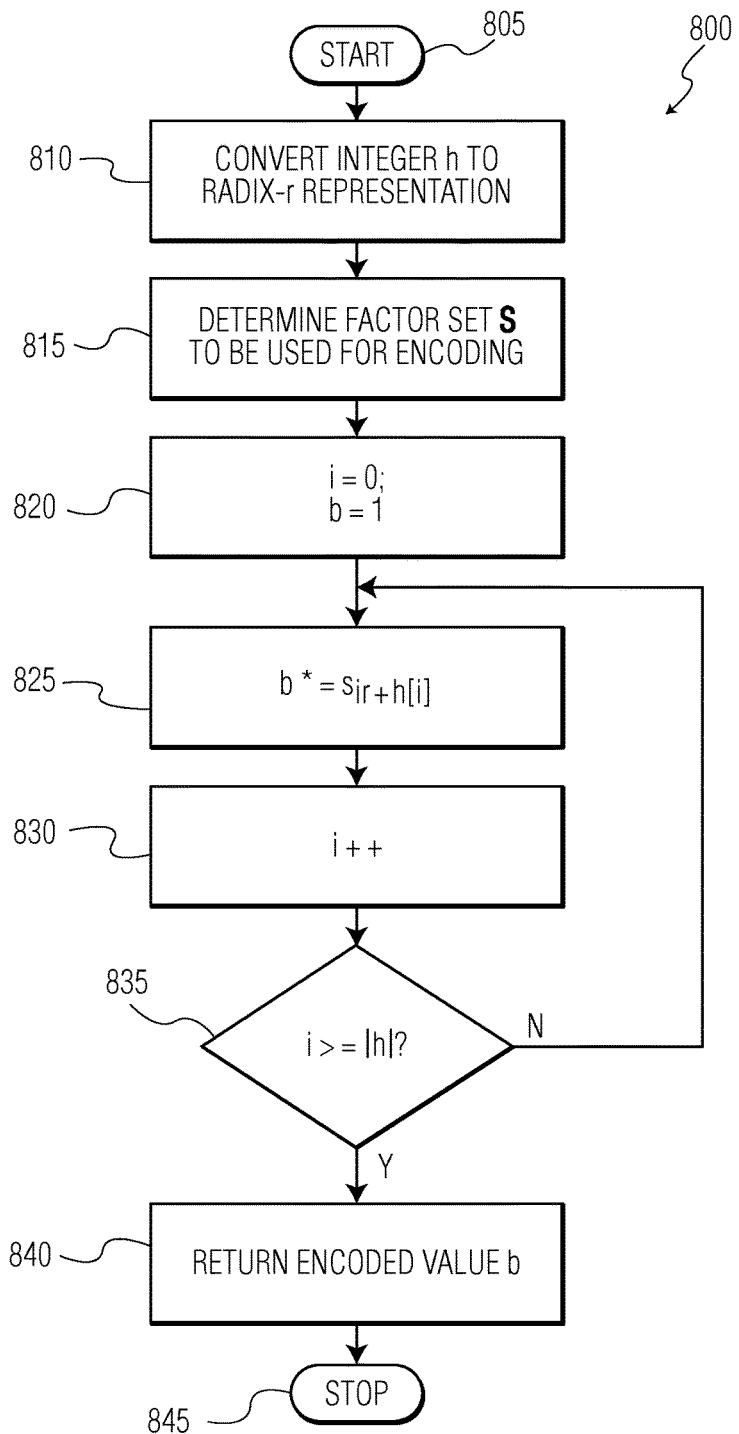
FIG. 8 illustrates a second example of an encoding method.

FIG. 8 illustrates an example embodiment of the second example of an encoding method 800. This method may correspond to the encoding algorithm 164 of FIG. 1 and may be called in step 315 of the digital signature generation method 300. Alternatively, the encoding method 800 may be used in various other contexts outside of the digital signature or modular exponentiation methods described herein.

The method 800 begins in step 805 and proceeds to step 810 where the device converts the integer to be encoded to a radix-r representation (where the radix r is a preconfigured radix to be used for encoding). Then, in step 815, the device determines the factor set S to be used. Again, this set S may be preconfigured for use in encoding. For example, the radix and factor set may be received from a content server and stored for later use. The device then initializes an index, i, and a working encoded value, b, in step 820.

In step 825, the device incorporates the appropriate factor from S into the working encoded value, b. For example, as shown, the device first identifies the appropriate index as ir+$h_i$, and multiplies the working value by the element in S corresponding to this index. The first term in this computed index (ir) thus sets the index at the beginning of the subset of S corresponding to the current digit position and the second term ($h_i$) moves the index to the position within this subset that corresponds to the value of h at that digit position. Various modifications will be apparent. For example, in some embodiments, one factor may be removed from S for each digit position and a digit value of 0 may result in no factor from the corresponding subset being incorporated into b, in a manner similar to that explained and illustrated above with respect to method 600 (where a binary 0 results in the corresponding factor not being incorporated into the working value). Various modifications to the encoding and decoding methods to enable this and other variations will be apparent.

After modification of the working value, b, in step 825, the device increments the index in step 830. Then, in step 835, the device determines whether all digit portions in h have been considered. For example, the device may determine whether i is equal to (or somehow greater than) the number of radix-r digits in h. If not, the method 800 loops back to step 825 to consider the next digit position. Otherwise, the method 800 proceeds to return the encoded value, b, in step 840 to the requesting method such as, for example, the digital signature generation method 300. The method then proceeds to end in step 845.

Figure 9:
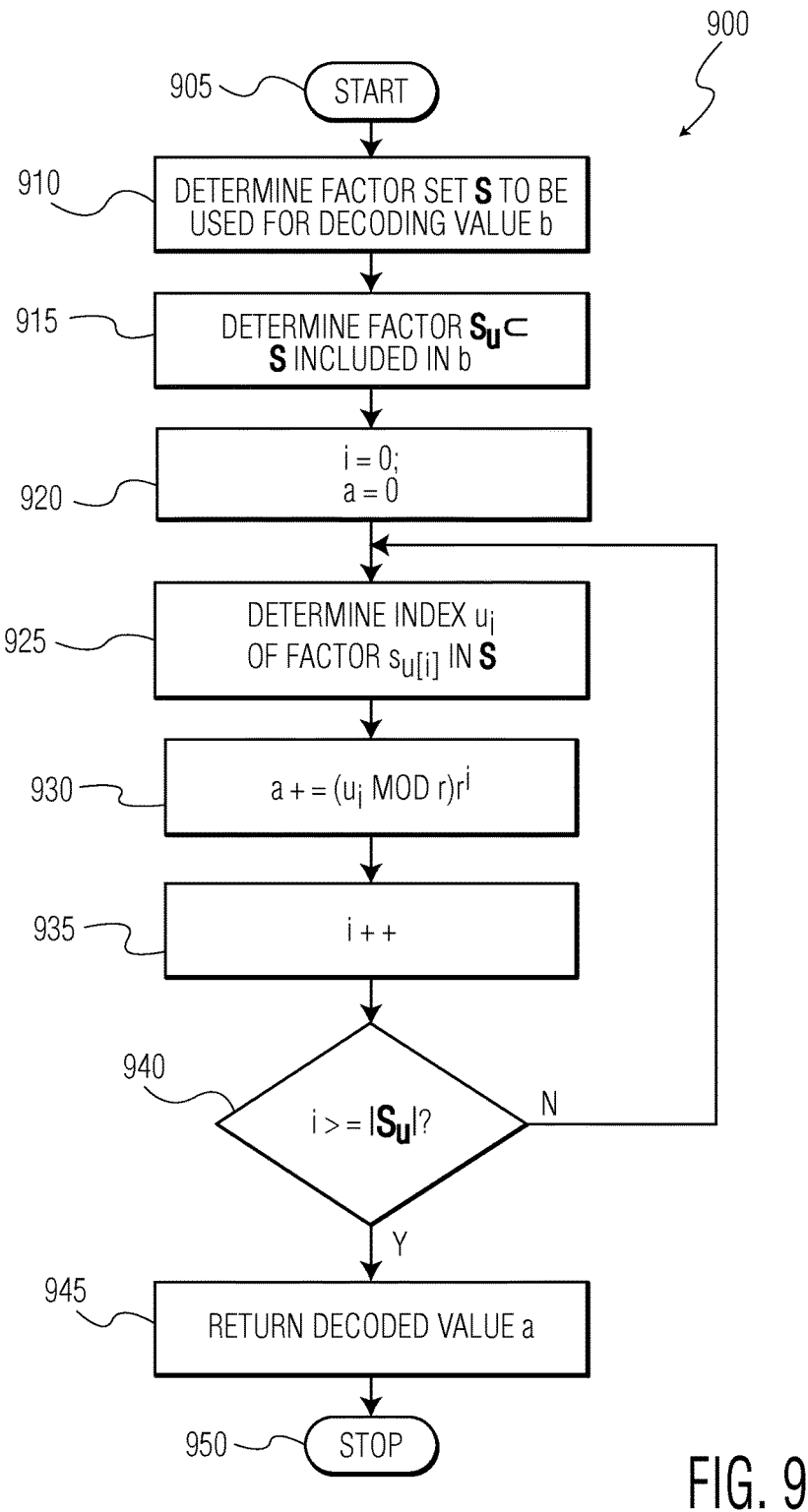
FIG. 9 illustrates a second example of a decoding method.

FIG. 9 illustrates an example embodiment of the second example of a decoding method 900. This method may correspond to the decoding algorithm 164 of FIG. 1 and may be called in step 425 of the digital signature verification method 400. Alternatively, the decoding method 900 may be used in various other contexts outside of the digital signature or modular exponentiation methods described herein.

The method 900 begins in step 905 and proceeds to step 910 where the device determines the factor set S that was used for encoding a value b to be decoded. For example, where the method 900 is implemented to operate in conjunction with the example encoding method 800, the set S (along with a radix, r) may be preconfigured to be used. In step 915, the device determines the set of factors $S_u \subset S$ that are factors of the encoded value through, for example, trial division. The device then initializes an index, i, and working decoded value, a, in step 920.

In step 925, the device determines an index, $u_i$, within the full factor set S of the $i^{th}$ factor in $S_u$. For example, for a factor set S={2, 3, 4, 5, 6, 7, 8, 9, 10} and factor subset $S_u$={4, 5, 10}, the first time executing step 925 when i=0, $u_i$=2 because $S_{u[0]}$=4 and l(4)=2 (i.e., 4 is the $2^{nd}$ factor in the 0-indexed set S). After determining the index, the device modifies the working value, a, accordingly. Specifically, as shown, the term ($u_i$ mod r) $r^i$ is added to the current value of a.

After modifying the working value in step 930, the device increments the index, i, in step 935. Then, in step 940, the device determines whether the all factors in $S_u$ have been considered. For example, the device may determine whether i is equal to (or somehow greater than) the number of factors in $S_u$. If not, the method loops back to step 925 to consider the next factor. Otherwise, decoding is finished and the method 900 returns the decoded value, a, to the requestor in step 945 such as, for example, a digital signature verification method such as method 400. The method then proceeds to end in step 950.

According to a third example, the encoding and decoding functions consider only subsets of factors of a specified weight, w. In other words, each possible value to be encoded, h, is associated with a unique set $T \subset S$ having the size w. As such, this third example considers the set U of all possible w-subsets from $S_K$ i.e., all sets T with w elements from $S_K$. The decoding and encoding functions utilize a ranking and unranking function, respectively. As will be understood, for the prime-square-powers set, a ranking function R: $U \to \mathbb{Z}/2^n\mathbb{Z}$ given a w-subset will return that subset's rank in the set, a=R(T). The reverse function, the unranking function, $R^{-1}$: $\mathbb{Z}/2^n\mathbb{Z} \to U$, returns the w-subset at rank a, $T=R^{-1}(a)$. Virtually any ranking and unranking functions may be used in conjunction with this third example such as those described in Jörg Arndt, *Algorithms for programmers—ideas, algorithms and source code*, 2004; R. L. Rivest, A. Shamir, and L. Adleman, *A method for obtaining digital signatures and public-key cryptosystems*, Communications of the ACM 21 (1978), 120-126; Gordon Royle, *Combinatorial enumeration: Theory and practice*, 2004; and Derrick Stolee, *Ranking and unranking of combinations and permutations*, available at http://computationalcombinatorics.wordpress.com/2012/09/10/ranking-and-unranking-of-combinations-and-permutations/, accessed September 2012; the entire disclosures of which are hereby incorporated herein by reference for all purposes.

According to the third example, the system is initialized by selecting a maximum factor value, B, and setting the parameters K (when the factor set S is the prime-square-power factor set described above) and w such that $$(\forall T \subseteq S_K): |T| \le w \Rightarrow \Pi T < N.$$

This constraint is satisfied if and only if $$\prod_{i=k-w}^{k-1} s_i < N \text{ for } s_i \in S_K.$$

Having established the foundation parameters, the encoding function may be defined as $$\text{ENCODE}(A) = \prod_{s \in T} s \text{ with } T = R^{-1}(a).$$

Additionally, given a B-smooth integer, $$v = \prod_{i=0}^{w-1} u_i,$$

the decoding function may be defined as $$\text{DECODE}(v) = R(\{u_0, \ldots, u_{w-1}\}).$$

This decoding may only be possible where v exists in the encoding domain, V, such that $$V = \left\{ \prod_{s \in T} s < N : T \subseteq S_K, |T| = w, R(T) < 2^n \right\}.$$

While the encoding width, n, will be at least partially dependent on the selected ranking and unranking functions, the maximum encoding width may be determined as $$n = \max_{K,w}\left\lfloor \log_2\binom{K}{w}\right\rfloor,$$

such that the parameters K and w satisfy the aforementioned constraint to be met when selecting these parameters. For example, for a 1024-bit modulus, Table 2 shows example choices for the parameters K and w for an encoding width w of either 128 or 256, that aims to minimize the number of entries k in the lookup table, L. For these widths, the gain in size is roughly a factor of 2 compared to the second example.

TABLE 2

| width n | k | B = $p_k$ | K | weight w |
|---|---|---|---|---|
| 128 | 50 | 229 | 138 | 52 |
| 256 | 245 | 1553 | 295 | 89 |
| 384 | 834 | 6397 | 869 | 81 |
| 492 | 4164 | 39581 | 4221 | 67 |

In various alternative embodiments of the third example, the method may be altered by considering all possible ranking functions $R_{K[j], w[j]}$, for all possible pairs of parameters ($K_j$, $w_j$) that satisfy the selection constraint and dedicate each ranking function to a separate rank interval. The first ranking function is used for interval $$0 \leq a < \binom{K_0}{w_0},$$

the second function for interval $$\binom{K_0}{w_0} \leq a < \binom{K_1}{w_1},$$

and so on. This allows for a total encoding width $$n = \log_2(\Sigma_{w_j}^{K_j}).$$

For a 1024-bit modulus N, this method may offer a 128-bit encoding width with only k-48 and a 256-bit encoding width with only k=238.

Figure 10:
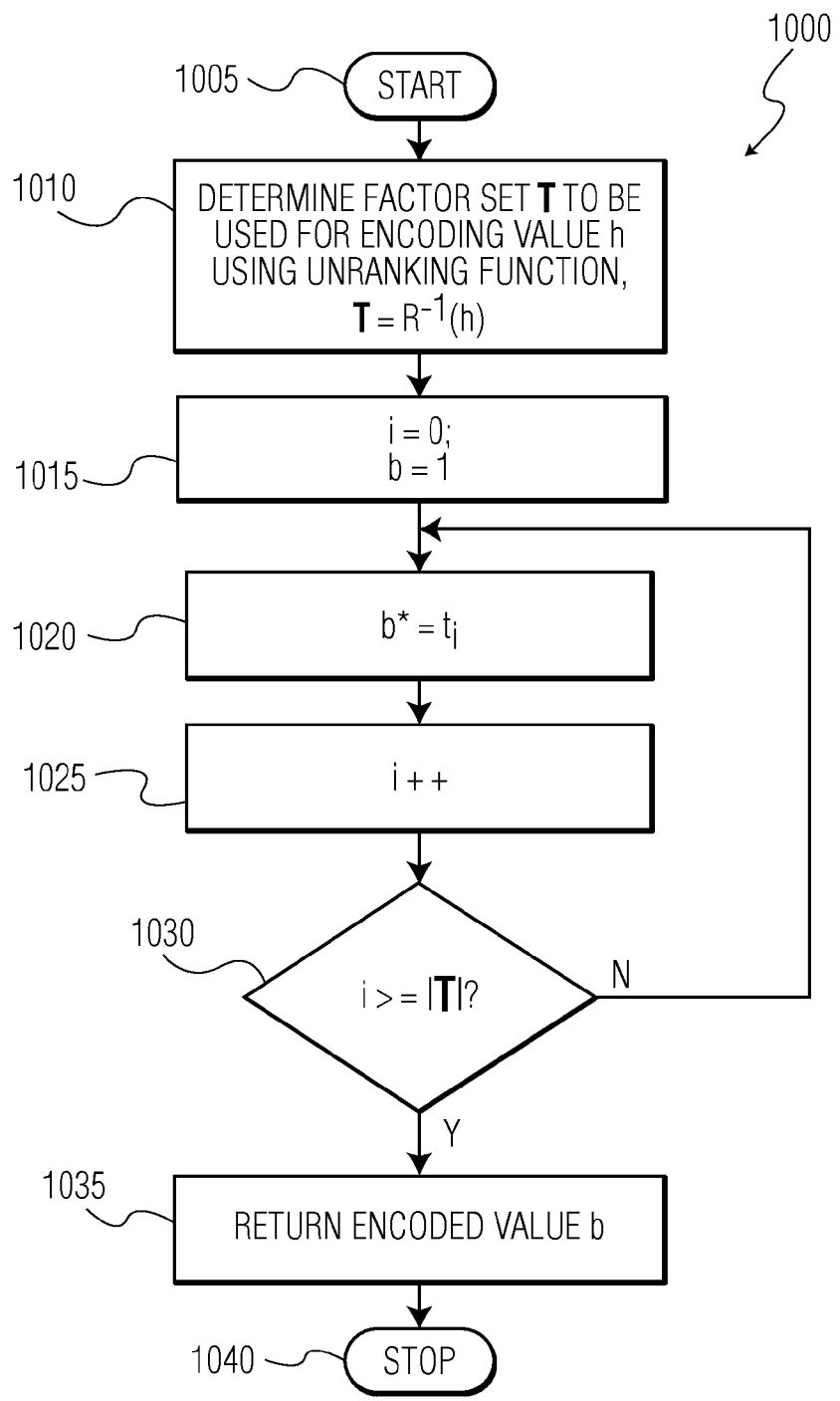
FIG. 10 illustrates a third example of an encoding method.

FIG. 10 illustrates an example embodiment of the third example of an encoding method 1000. This method may correspond to the encoding algorithm 164 of FIG. 1 and may be called in step 315 of the digital signature generation method 300. Alternatively, the encoding method 1000 may be used in various other contexts outside of the digital signature or modular exponentiation methods described herein.

The method 1000 begins in step 1005 and proceeds to step 1010 where the device determines the factor set T to be used for encoding a value h. Specifically, the device applies an unranking function to the value, h, to retrieve the set T. In some embodiments, such as those where multiple unranking functions are considered with different combinations of parameters K and w, as described above, this step may also include selecting the appropriate unranking function for the value, h.

The device then initializes an index, i, and working encoded value, b, in step 1015. In step 1020, the device incorporates a factor from T into the working encoded value by multiplying the current value, b, by the $i^{th}$ element of T. The device then increments the index, i, in step 1025.

Next, the device determines whether all factors in T have been considered. For example, the device may determine whether i is equal to (or somehow greater than) the number of elements in T. If not, the method 1000 loops back to step 1020 to incorporate the next factor. Otherwise, the method 1000 proceeds to return the encoded value, b, in step 1035 to the requesting method such as, for example, the digital signature generation method 300. The method then proceeds to end in step 1040.

Figure 11:
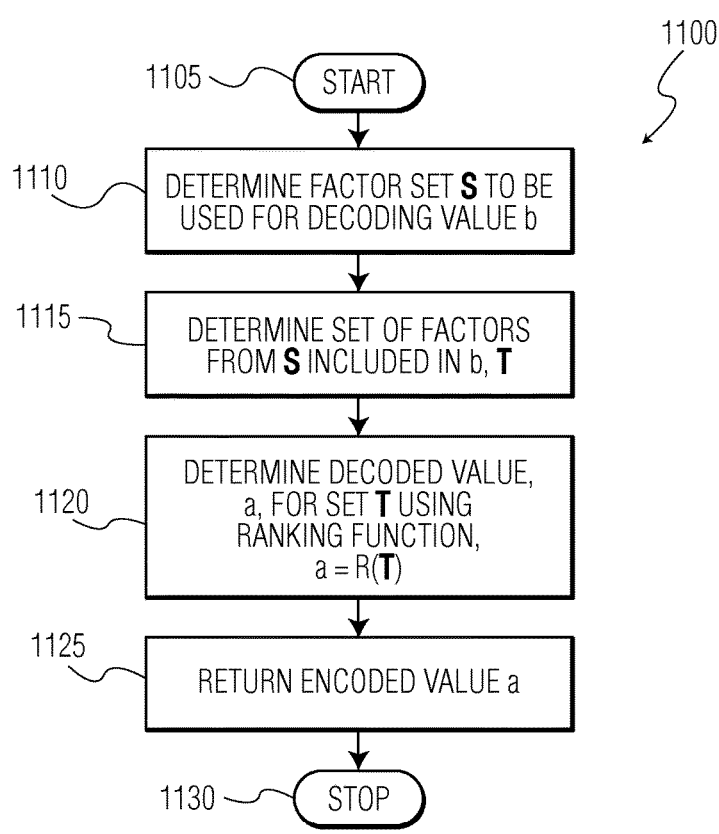
FIG. 11 illustrates a third example of a decoding method.

FIG. 11 illustrates an example embodiment of the third example of a decoding method 1100. This method may correspond to the decoding algorithm 164 of FIG. 1 and may be called in step 425 of the digital signature verification method 400. Alternatively, the decoding method 1100 may be used in various other contexts outside of the digital signature or modular exponentiation methods described herein.

The method begins in step 1105 and proceeds to step 1110 where the device determines the factor set S that was used for encoding a value b to be decoded. For example, where the method 1100 is implemented to operate in conjunction with the example encoding method 1000, the set S (along with a ranking function) may be preconfigured to be used. Then, in step 1115, the device identifies the w elements from S (i.e., the w-subset T) that are factors of the encoded value b. For example, the device may make this determination using trial division.

After determining the set T, the device executes a ranking function to identify the rank, a, of the set T within the set S. In alternative embodiments where multiple ranking/unranking function pairs may be used depending on the original value and in association with different parameters K and w, this step may include selecting the appropriate ranking function. For example, the encoding device may forward to the decoding device an identifier of the appropriate ranking function to use based on the unranking function initially chosen. In some such embodiments, this information may also influence steps 1110 and 1115, as different values of K may lead to different sets S being used while different values of w may lead to different length sets T being identified. In other such embodiments, the device may infer the values based on the number of factors in S that are factors of b, gradually increasing the size of S until all factors are located (thus yielding the values of K and w).

As noted above, the rank, a, returned by the ranking function is also the decoded value. Thus, after applying the ranking function, decoding is finished and the method 1100 returns the decoded value, a, to the requestor in step 1125 such as, for example, a digital signature verification method such as method 400. The method then proceeds to end in step 1130.

According to the foregoing, various embodiments enable encoding and modular exponentiation (e.g. to generate digital signatures) without access to a secret exponent, d. For example, by providing a pre-computed lookup table including modular exponentiations of the factors of the values to be modular exponentiated, a white-box implementation may nonetheless compute the modular exponentiation without access to the secret exponent, d. Further, various encoding and decoding algorithm pairs described herein (and variations thereof) provide further improvements allowing for, for example, smaller lookup tables to be computed. Various additional benefits will be apparent in view of the foregoing.

It should be apparent from the foregoing description that various embodiments of the invention may be implemented in hardware. Furthermore, various embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various embodiments have been described in detail with particular reference to certain aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A non-transitory machine-readable medium encoded with instructions for performing modular exponentiation, the non-transitory machine-readable medium comprising instructions to cause a processor to:
   determine a plurality of factors of a value to be exponentiated;
   retrieve, from a lookup table stored in a memory, a plurality of lookup table entries associated with the plurality of factors;
   calculate a product of the plurality of lookup table entries; and
   calculate a residue of the product using a cryptographic key modulus to produce an exponentiated value.

2. The non-transitory machine-readable medium of claim 1, wherein the instructions to determine the plurality of factors of the value to be exponentiated comprise:
   encode a second value by identifying the plurality of factors from a factor set to represent the second value.

3. The non-transitory machine-readable medium of claim 1, further to cause the processor to:
   determine the plurality of factors of the value to be exponentiated includes the processor to determine a plurality of indices respectively associated with the plurality of factors in a factor set; and
   retrieve a plurality of lookup table entries associated with the plurality of factors includes the processor to retrieve the plurality of lookup table entries from positions in the lookup table respectively indicated by the plurality of indices.

4. The non-transitory machine-readable medium of claim 1, further comprising:
   instructions for computing a digest of a message to be digitally signed;
   instructions for encoding the digest to produce the value to be exponentiated; and
   instructions for transmitting the message and exponentiated value as a digital signature to a network device.

5. The non-transitory machine-readable medium of claim 1, further comprising:
   instructions for receiving the lookup table from a network device; and
   instructions for storing the lookup table for subsequent access by the instructions for retrieving a plurality of lookup table entries.

6. The non-transitory machine-readable medium of claim 1, wherein the plurality of factors are a plurality of prime numbers belonging to a predetermined factor set.

7. The non-transitory machine-readable medium of claim 1, further comprising instructions for encoding a value to produce the value to be exponentiated comprising:
   instructions for iterating through bit positions of the value;
   instructions for including, in the encoded value a factor corresponding to a bit position within a set of factors when the bit at position in the value, $h_i$, is set.

8. A device to perform modular exponentiation, the device comprising:
   a memory configured to store a lookup table; and
   a processor in communication with the memory, the processor being configured to:
      determine a plurality of factors of a value to be exponentiated;
      retrieve, from the lookup table, a plurality of lookup table entries associated with the plurality of factors;
      calculate a product of the plurality of lookup table entries; and
      calculate a residue of the product using a cryptographic key modulus to produce an exponentiated value.

9. The device of claim 8, wherein in determining a plurality of factors of a value to be exponentiated the processor is configured to:
   encode a value, h, by identifying the plurality of factors from a factor set to represent the value.

10. The device of claim 8, wherein:
    in determining a plurality of factors of a value to be exponentiated the processor is configured to determine a plurality of indices respectively associated with the plurality of factors in a factor set; and
    in retrieving a plurality of lookup table entries associated with the plurality of factors the processor is configured to retrieve the plurality of lookup table entries from positions in the lookup table respectively indicated by the plurality of indices.

11. The device of claim 8, further comprising a network interface in communication with the processor, wherein the processor is configured to:
    compute a digest of a message to be digitally signed;
    encode the digest to produce the value to be exponentiated; and
    transmit, via the network interface, the message and exponentiated value as a digital signature to a network device.

12. The device of claim 8, further comprising a network interface in communication with the processor, wherein the processor is configured to:
    receive the lookup table from a network device via the network interface; and
    store the lookup table for subsequent access by the instructions for retrieving a plurality of lookup table entries.

13. The device of claim 8, wherein the plurality of factors are a plurality of prime numbers belonging to a predetermined factor set.

14. The device of claim 8, wherein the processor is further configured to encode a value to produce the value to be exponentiated comprising:
- iterating through bit positions of the value;
- including, in the encoded value a factor corresponding to a bit position within a set of factors when the bit at position in the value is set.

* * * * *